United States Patent [19]
Culley et al.

[11] Patent Number: 5,870,568
[45] Date of Patent: *Feb. 9, 1999

[54] DOUBLE BUFFERING OPERATIONS BETWEEN THE MEMORY BUS AND THE EXPANSION BUS OF A COMPUTER SYSTEM

[75] Inventors: Paul R. Culley, Cypress; Mark Taylor, Houston, both of Tex.

[73] Assignee: Compaq Computer Corporation, Houston, Tex.

[ * ] Notice: The term of this patent shall not extend beyond the expiration date of Pat. No. 5,519,839.

[21] Appl. No.: 903,949

[22] Filed: Jul. 31, 1997

Related U.S. Application Data

[63] Continuation of Ser. No. 615,807, Mar. 14, 1996, which is a continuation of Ser. No. 956,068, Oct. 2, 1992, Pat. No. 5,519,839.

[51] Int. Cl.$^6$ .............................. G06F 13/16; G06F 13/20
[52] U.S. Cl. ......................... 395/281; 395/310; 395/306; 395/872; 711/100; 711/143
[58] Field of Search ..................................... 395/281, 310, 395/306, 872; 71/143, 100

[56] References Cited

U.S. PATENT DOCUMENTS

| | | | |
|---|---|---|---|
| 4,811,295 | 3/1989 | Shinoda | 365/189.05 |
| 4,845,667 | 7/1989 | Hoptner et al. | 711/102 |
| 5,018,098 | 5/1991 | Taniai et al. | 395/842 |
| 5,247,643 | 9/1993 | Shottan | 711/143 |
| 5,289,584 | 2/1994 | Thome et al. | 711/109 |

FOREIGN PATENT DOCUMENTS

| | | |
|---|---|---|
| 0 244 540 | 10/1988 | European Pat. Off. . |
| 0 293 720 | 12/1988 | European Pat. Off. . |
| 0 392 657 | 10/1990 | European Pat. Off. . |
| 0 468 823 | 1/1992 | European Pat. Off. . |
| 63-280365 | 11/1988 | Japan . |

OTHER PUBLICATIONS

Texas Instruments, Tact84500 EISA Chip Set User's Guide, pp. 8–1 to 8–7, 9–1 to 9–11, 1991.

Intel Corp., 1993 Peripheral Components, pp. 1–104 to 1–128, 1993.

Intel Corp., 82495 Specification, pp. 1, 24–28, 38–42, 1992.

*Primary Examiner*—Reginald G. Bragdon
*Attorney, Agent, or Firm*—Sharp, Comfort & Merrett, P.C.

[57] ABSTRACT

Double buffering operations to reduce host bus hold times when an expansion bus master is accessing the main memory on a host bus of a computer system. A system data buffer coupled between the main memory and the expansion bus includes 256-bit double read and write buffers. A memory controller coupled to the double read and write buffers and to the expansion bus includes primary and secondary address latches corresponding to the double buffers. The memory controller detects access to the main memory, compares the expansion bus address with the primary and secondary addresses and controls the double read and write buffers and the primary and secondary address latches accordingly. During write operations, data to be written to the same line of memory is written to a first of the double write buffers until a write occurs to an address to a different line before data is transferred to main memory. During read operations, a full line is loaded into a first of the double read buffers, and the next full line is retrieved into a second read buffer from main memory if a subsequent read hit occurs in the first read buffer.

42 Claims, 21 Drawing Sheets

DMA MEMORY WRITE CYCLE TO HOST MEMORY 32
(M25 : 25 MHZ MODE) (DON'T OWN HOST BUS)

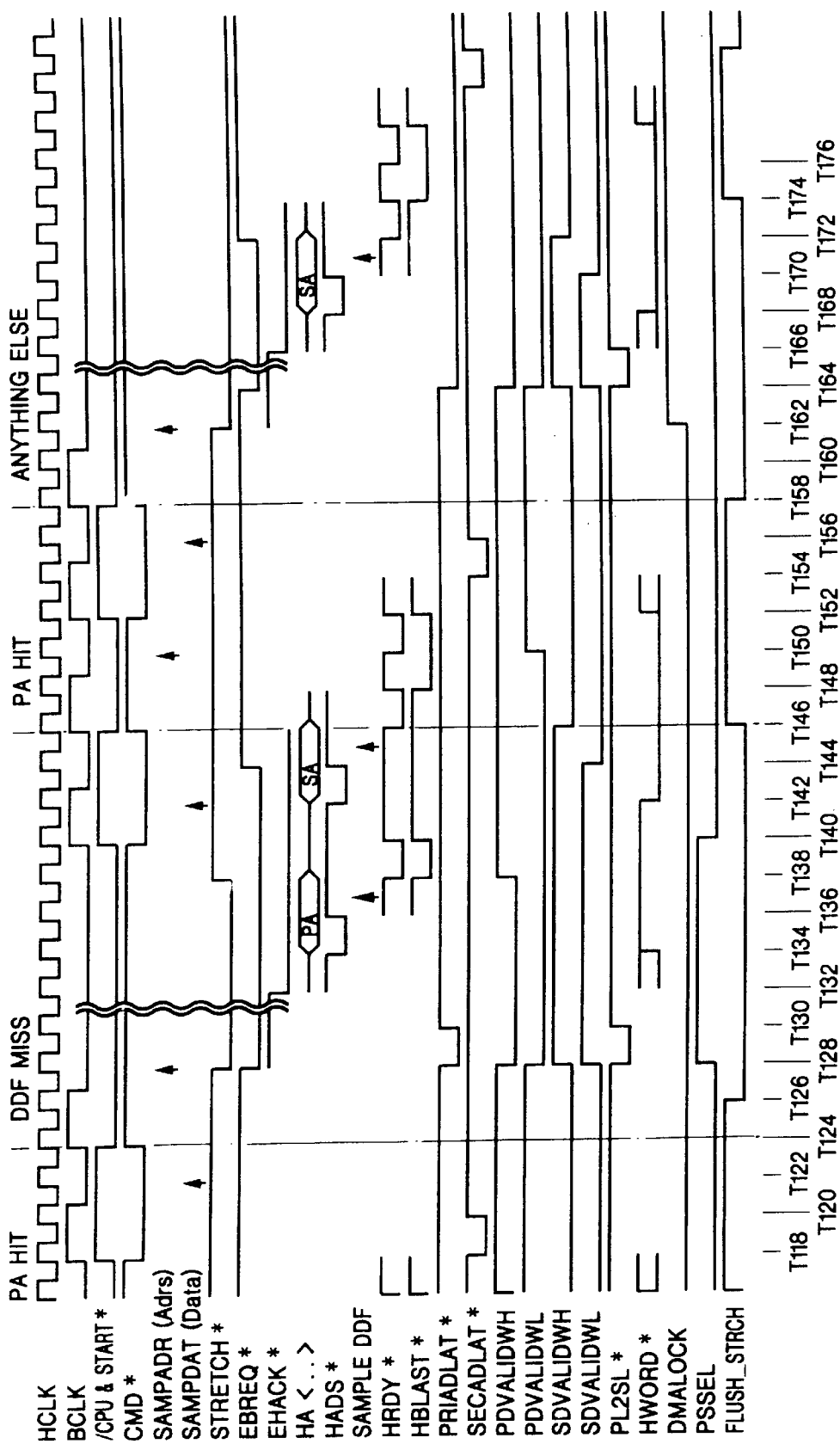

ISA READ CYCLE TO HOST MEMORY
( M25 : 25 MHZ MODE ) ( DONT OWN HOST BUS )

DOUBLE BUFFERING OPERATIONS BETWEEN THE MEMORY BUS AND THE EXPANSION BUS OF A COMPUTER SYSTEM

This application is a continuation of U.S. application Ser. No. 08/615,807 filed Mar. 14, 1996, which is a continuation of U.S. application Ser. No. 07/956,068 filed Oct. 2, 1992, issued as U.S. Pat. No. 5,519,839, issued on May 21, 1996.

BACKGROUND OF THE INVENTION

1. Field of the Invention

The present invention relates to a method and apparatus for performing double buffering operations when an EISA bus master is accessing main memory on the memory bus. In particular, double buffers are provided which serve as posting buffers until a full line is obtained, thereby reducing host bus hold times.

2. Description of the Related Art

The personal computer industry is evolving quickly due to the increasing demand for faster, smaller and more powerful computers. The general structure of a personal computer system typically includes a microprocessor or host bus for interfacing one or more processors with main memory, an expansion bus such as the Extended Industry Standard Architecture (EISA) bus which is used to interface with one or more optional external plug-in logic circuit boards, and also an X bus for interfacing with a plurality of peripheral devices such as a keyboard and a floppy disk controller. In a multiprocessor system, the processors typically share the host bus to access the main memory.

The EISA bus specification was introduced several years ago and describes all of the parameters that must be followed for any device to interface with the EISA bus. For more details, please refer to U.S. Pat. No. 5,101,492, specifically Appendix A, which patent is hereby incorporated by reference. Thus, bus masters, DMA devices or any other devices designed to interface with the EISA bus must follow the EISA bus specifications. In particular, the EISA data bus is 32 bits wide and the EISA bus includes a clock signal which is typically approximately 8 MHz. Modern processors, such as the 80386 or i486 microprocessors by Intel, are designed to operate at significantly higher speeds then the EISA bus. Also, processors are incorporated into central processing units (CPUs) which may be designed to operate with larger and faster host buses. For example, host buses have been designed to operate at 25 megahertz (MHz) to over 33 MHz and may include up to 64 data bits or more.

Memory arrays are keeping pace with processor innovation. Dynamic Random Access Memories (DRAMs) typically used to implement main memory are slower than SRAMs but are typically interleaved to help keep pace with CPUs. EISA bus masters attached to the EISA bus require access to the main memory, typically through a bus controller interface attached between the host bus and the EISA bus. Access through the host bus may be necessary so that the CPUs can snoop the EISA addresses to perform cache write back or invalidation cycles if necessary. Due to the relatively slow clock speed and narrow data width defined for the EISA bus, it is undesirable for an EISA bus master requiring access to the main memory to tie up the host bus for its entire write or read cycle. This is especially true since the CPUs attached to the host bus must remain idle if they also require access to the main memory or the host bus.

It is desirable therefore to provide a buffering means to isolate the host bus and main memory from slower devices on the EISA bus such as EISA bus masters. Also, the devices accessing main memory should not detect any differences in access to the main memory.

SUMMARY OF THE PRESENT INVENTION

A method and apparatus for performing double buffering operations according to the present invention significantly reduces the number of read and write accesses to the main memory connected to the host bus initiated by devices connected to the expansion bus.

A system data buffer (SDB) is provided between the host bus, the expansion bus and the memory bus. The SDB preferably includes a relatively large write double buffer and a similar read double buffer coupled between the expansion and memory buses. These read and write buffers are preferably 256 bits wide, which corresponds to the size of a line of memory. A memory controller coupled to the SDB and the main memory preferably includes primary and secondary address latches corresponding to the double buffers. The memory controller detects accesses to the main memory from the expansion bus, compares the expansion bus address with those in the primary and secondary address latches and controls the read and write buffers accordingly.

A snoop cycle is executed on the host bus to determine whether the data is directed to the main memory. If so, the data for an initial write cycle from the expansion bus to the main memory is written into a primary write data buffer. This is referred to as DDF (data destination facility) snooping in the preferred embodiment where DDF logic is provided to perform memory mapping functions. The primary data buffer is continually loaded with subsequent writes to memory as long as subsequent addresses are within the same line indicated by the primary address stored in the primary address latch. These writes to the same line are referred to as primary address hits, or PAHITs. If a write occurs to an address outside the line indicated by the primary address (PA), which is referred to as a PA miss, but the write is still within the same page of main memory where the page size is preferably 128K bytes, which is referred to as a DDFHIT, the memory controller transfers the data from the primary write data buffer to the secondary write data buffer, and a host bus write cycle is executed to transfer the data from the secondary write data buffer to main memory. The address from the primary address latch is then copied to the secondary address latch to setup the proper address for the next write to main memory and the address of the write is copied to the primary address latch. Then, the new data is written into the primary write data buffer to main memory. In this manner, a host cycle is not required to be executed for each expansion bus write operation, which significantly reduces host bus hold times.

If a write from the expansion bus to memory is outside the page size of the current primary address, referred to as a DDF page miss, the data is transferred to the secondary write data buffer and two consecutive host bus cycles are executed. The first cycle is to perform a DDF snoop to determine if the new address is intended for the main memory, and the second cycle is executed to transfer the data from the secondary write data buffer to main memory. If the DDF snoop indicates the write is to main memory, the data is loaded into the primary data buffer. The addresses are copied as appropriate.

For an initial read cycle, a full line of data corresponding to the expansion bus address is latched through a secondary read data buffer to a primary read data buffer, which is readily accessible by the bus master on the expansion bus. A subsequent memory read within the primary read data buffer is also referred to as a PAHIT, where the data is immediately available from the primary read data buffer in the SDB. Also, since the secondary read data buffer is empty, a secondary buffer fill cycle occurs where the primary address is incremented and the next line of data from main memory is loaded into the secondary read data buffer. If the secondary read data buffer is empty and a read to an address within the incremented secondary address occurs, referred to as a secondary address hit (SAHIT), a primary buffer fill cycle occurs where the next line of data is loaded through the secondary read data buffer to the primary read data buffer from main memory. Also, if the read address is not within the primary or secondary address range but still within the same page causing a DDFHIT, a primary buffer fill cycle is also executed. If the secondary read data buffer is full and a SAHIT occurs, the data is transferred to the primary read data buffer for access to the expansion bus, and a host cycle is executed to fill the secondary read data buffer with the next full line of data from main memory.

Random access memory (RAM) refresh cycles are also supported through double buffer operations thereby enhancing speed. Snoop logic determines if a snoop read hit occurs where a CPU attempts to read from an address location which has data currently buffered within the SDB. If this occurs, a non-maskable interrupt (NMI) is generated. If a snoop write hit occurs where the CPU writes to a location currently buffered in the SDB, the read buffers in the SDB are invalidated.

BRIEF DESCRIPTION OF THE DRAWINGS

A better understanding of the present invention can be obtained when the following detailed description of the preferred embodiment is considered in conjunction with the following drawings, in which:

FIGS. 9A,9B are a timing diagram showing DMA memory write cycles to the main memory of FIG. 1, further illustrating double buffered operations according to the present invention;

DETAILED DESCRIPTION OF THE PREFERRED EMBODIMENT

Figure 1:
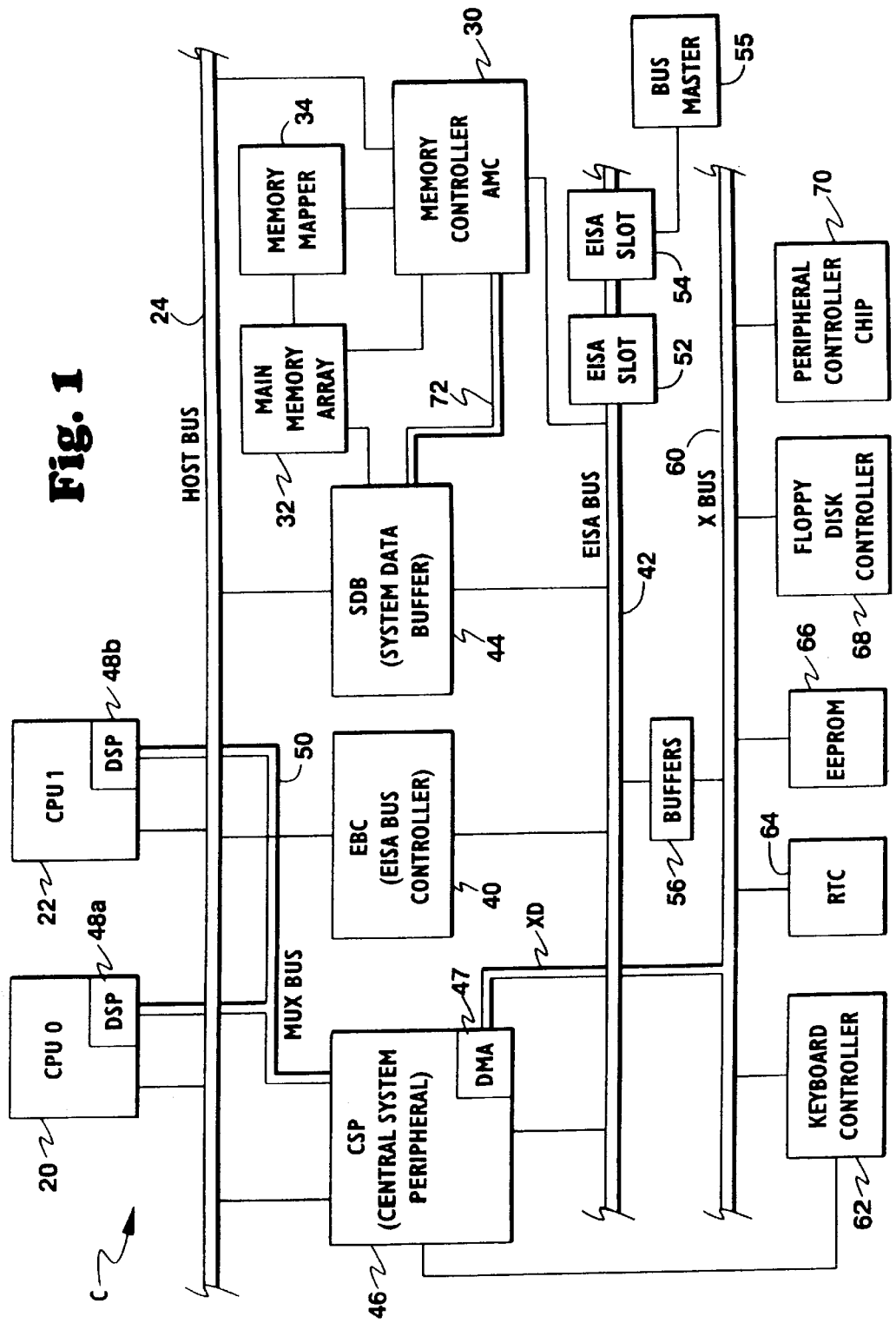
FIG. 1 is a block-diagram of a computer system incorporating a double buffering apparatus according to the present invention.

Referring now to FIG. 1, a computer system C is shown incorporating a double buffering apparatus according to the present invention. The computer system C is preferably a multiprocessor system, although a computer system according to the present invention may include more processors or may be a single processor system. The elements of the computer system C that are not significant to the present invention, other than to illustrate an example of a fully configured computer system, are not discussed in detail.

The computer system C preferably includes two CPUs, referred to as CPU 20 and CPU 22, respectively, which are connected to a host bus 24. The host bus 24 preferably includes a host clock signal referred to as HCLK, which is preferably approximately 25 MHz or 33 MHz depending upon the desired speed of the computer system. In the preferred embodiment, CPU 20 is logically assigned the position of CPU0, and CPU 22 is assigned logical CPU1, although these assignments are preferably programmable and may be changed. A memory controller 30 is coupled to the host bus 24 to an expansion bus 42, where the expansion bus 42 is preferably the Extended Industry Standard Architecture (EISA) bus, although other types of expansion buses are contemplated. The memory controller 30 is also coupled to a main memory array 32, where the memory array 32 preferably comprises dynamic random access memory (DRAM). A data destination facility (DDF), otherwise known as memory mapper logic 34, is coupled to the memory controller 30 and the memory array 32, and provides memory mapping functions to facilitate memory accesses to the memory array 32. The memory mapper 34 is used in the preferred embodiment to generate a signal HLOCAL*, which is asserted low when an address appearing on the host bus 24 is to the memory array 32. An asterisk at the end of a signal name denotes negative logic where the signal is asserted low and negated high.

The computer system C includes an EISA bus controller (EBC) 40, which is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42, the memory controller 30 and the memory array 32. The connection between the SDB 44 and the memory controller 30 is preferably a memory bus 72, which includes 144 bits preferably comprising 128 data bits and 16 error check bits. The SDB 44 functions to buffer and transfer data between the host bus 24 and the memory array 32, between the host bus 24 and the EISA bus 42 and between the EISA bus 42 and the memory array 32.

A logic block referred to as the central system peripheral (CSP) 46 is coupled between the host bus 24 and the EISA bus 42. The CSP 46 is coupled to logic blocks referred to as the distributed system peripherals (DSPs) 48a and 48b in the CPUs 20 and 22, respectively, through a multiplexed (MUX) bus 50. For more information on the operation of the MUX bus 50, please see related U.S. Pat. No. 5,517,624 entitled MULTIPLEXED COMMUNICATION PROTOCOL BETWEEN CENTRAL AND DISTRIBUTED PERIPHERALS IN MULTIPROCESSOR COMPUTER SYSTEMS, which is hereby incorporated by reference. For more information on the CSP 46 and the DSPs 48a and 48b, please see related U.S. Pat. No. 5,437,042 entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, which is hereby incorporated by reference. The CSP 46 is also coupled to a keyboard controller 62. The CSP 48 includes a direct memory access (DMA) controller 47 which is preferably implemented as a true EISA bus controller, and will be used to illustrate cycles initiated on the EISA bus 42 to the host bus 24 accessing the memory array 32.

The EISA bus 42 includes a plurality of EISA slots 52 and 54 for receiving EISA expansion cards, such as network interface or hard disk interface cards for example. EISA bus masters may reside on these EISA expansion cards plugged into the EISA slots 52 and 54. The EISA bus 42 is coupled through buffers 56 to a bus referred to as the X bus 60. A number of peripheral devices are coupled to the X bus 60, including the keyboard controller 62, a real time clock (RTC) 64, an electrically erasable programmable read only memory (EEPRON) 66, a floppy disk controller 68, and a peripheral controller chip 70 which includes numerous parallel ports and UARTS (universally a synchronous receiver/transmitters). The CSP 46 is coupled to an 8-bit data bus of the X bus 60 referred to as XD.

The CPUs 20 and 22 preferably include cache memory and write back cache subsystems (not shown) which are preferably implemented to follow a modified exclusive shared invalid (MESI) protocol, where each of the cache subsystems may be the exclusive owner of data which was originally read from the memory array 32. The CPUs 20 or 22 may modify the data within its cache memory so that the new data is not the same as the data in the corresponding memory location in the memory array 32. The CPU 20 or 22 is then the exclusive owner of the data at that particular memory address and is responsible for maintaining the correctness of the data provided in any future read operations to that address. Also, the owner CPU must inform the other CPU having data from the corresponding data address of the cycle so that the other CPU can determine that its data is now valid.

Thus, if one of the CPUs 20 or 22 attempts to access data from the memory array 32 that is dirty, the owner CPU detects this read request, causes the other CPU that is on the host bus 24 to temporarily abort its access and the owner CPU 22 updates or writes-back the owned data to the memory array 32. In the preferred embodiment, the writeback is to an entire line of data, where each line is preferably 256 bits. Thus, read or write accesses initiated on the EISA bus 42 should be run on the host bus 24 for two purposes. First, to perform a DDF snoop cycle so the memory mapper 34 can indicate whether the EISA address is to the memory array 32, and also to satisfy the write-back protocol of the CPUs 20 and 22.

Figure 2A:
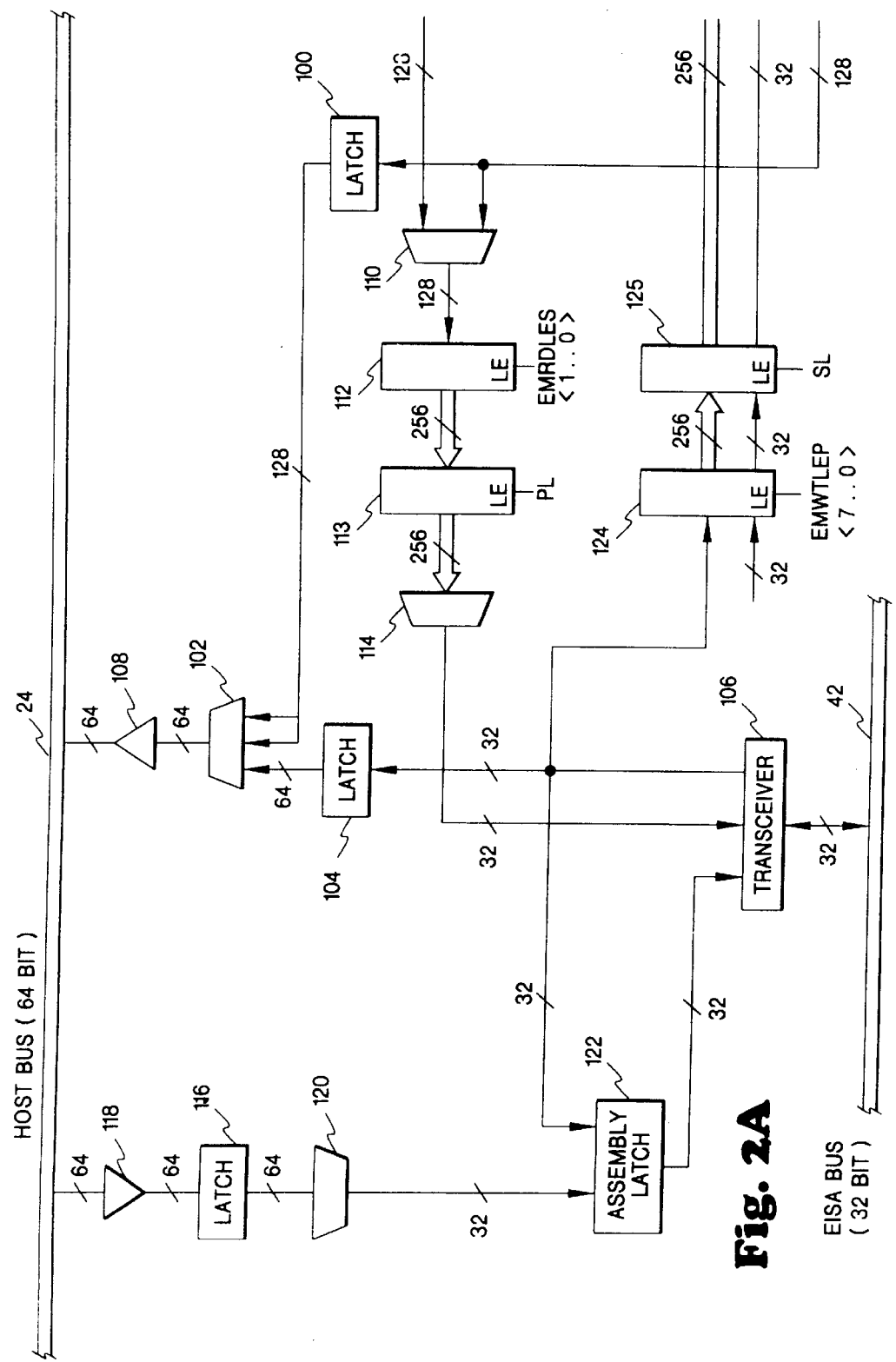
FIGS. 2A,2B are a block diagram of the system data buffer (SDB) of FIG. 1 incorporating a portion of the double buffering apparatus according to the present invention.
Figure 2B:
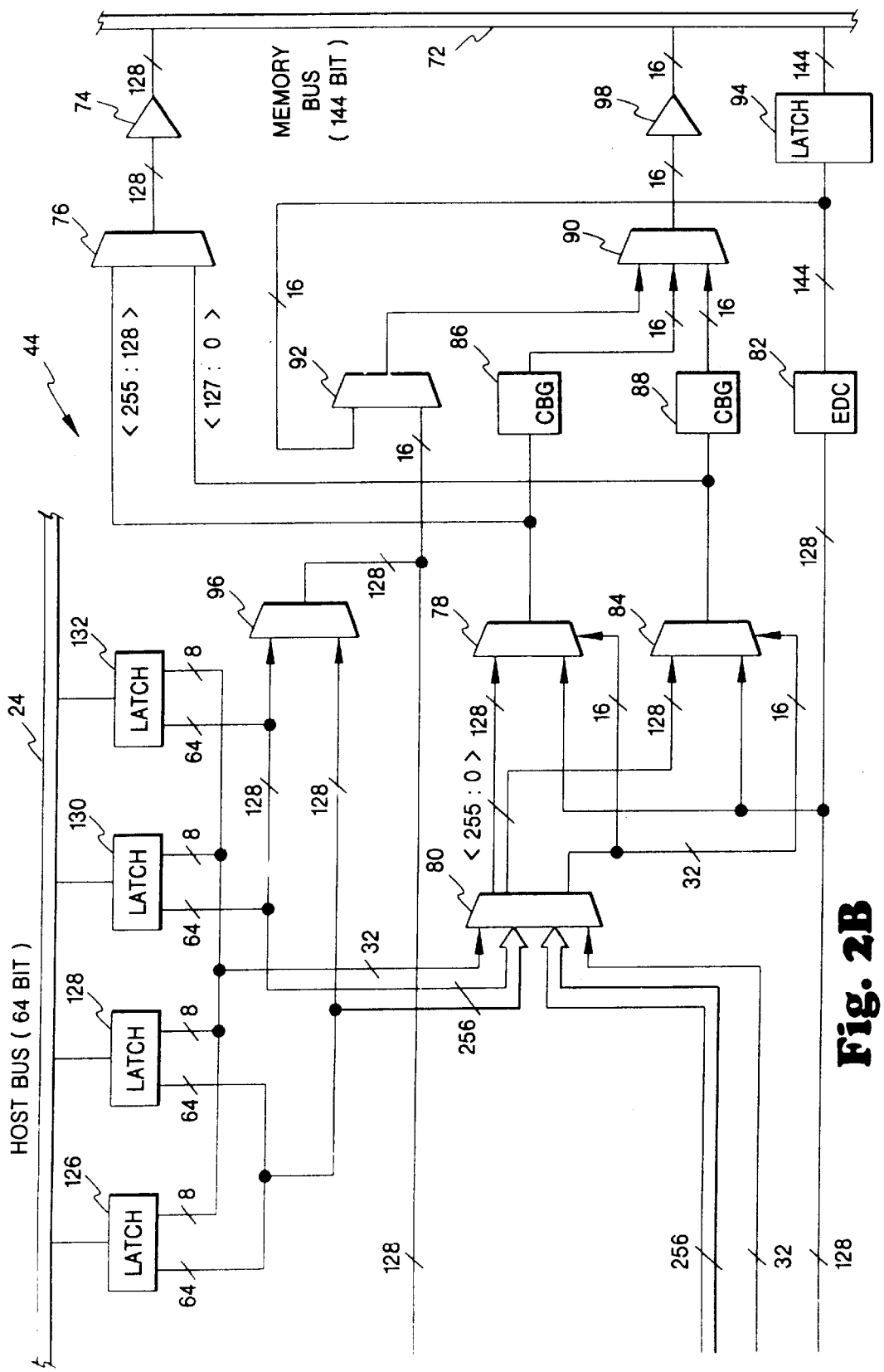

Referring now to FIGS. 2A and 2B, a block diagram of the SDB 44 is shown which shows the interface between the host bus 24, the EISA bus 42, and the memory bus 72. Data is transferred from bus to bus through the SDB 44 in data words preferably 256 bits wide. For write operations to the memory array 32, 128 bits of data are transferred to the memory bus 72 from the SDB 44 by a buffer 74 having its data input connected to the output of a multiplexer 76. The input of the multiplexer 76 is connected to the output of another multiplexer 78, which receives the upper 128 bits of data from another multiplexer 80 and 128 data bits transmitted by an EDC circuit 82. Each of the inputs of the multiplexer 80 are preferably 288 bits wide comprising 256 data bits or 32 bytes, and 32 byte valid bits. Each byte valid bit identifies whether a corresponding one of the 32 bytes of data is valid. The second input of the first multiplexer 76 is connected to the output of another multiplexer 84, which receives the lower 128 bits of data from the multiplexer 80 and the upper 128 data bits from the EDC circuit 82, discussed in more detail below. The 32 byte valid bits are split in two and provided to the 16-bit select inputs of the multiplexers 78 and 84, respectively. In this manner, only valid bytes from the multiplexer 80 are provided to the multiplexers 78 and 84, whereas the remaining bytes are retrieved from the EDC 82 during a read-merge-write operation, described further below.

The 128-bit outputs of the multiplexers 78 and 84 are provided to a pair of check bit generators (CBGs) 86 and 88. Each of the check bit generators 86 and 88 generates sixteen check bits based on the input data bits. The output of the check bit generators 86 and 88 are provided to the inputs of another multiplexer 90, which has a third set of inputs connected to the output of a multiplexer 92. One of the inputs of the multiplexer 92 is connected to the check bit output of a memory data read latch 94, which receives the stored check bits for a data doubleword when the doubleword is read from the memory array 32. The other input of the multiplexer 92 is connected to the lower sixteen output bits of a multiplexer 96, which receives the upper 128 bits of the host bus data at one set of inputs, and the lower 128 bits of the host bus data at another set of inputs. The multiplexer 96 permits particular bits to be provided to the check bit memory without accessing the data bits in the memory array 32. This permits the check bit memory to be tested independently of the data memory. The output of the multiplexer 90 is provided to a 16-bit buffer 98. The 16-bit output of the buffer 98 is connected to the memory bus 72 to store the check bits in the memory array 32.

During read cycles from the memory array 32, data and check bits read from the memory bus 72 are latched by a 144-bit latch 94. The latched data and check bits are then provided to the EDC circuit 82. The EDC circuit 82 detects errors and provides corrected data when data is retrieved from the memory array 32. If only a partial write is provided to the multiplexer 80, so that not all of the 32 byte valid bits are true, a read-merge-write operation is performed at the corresponding address from the memory array 32. In this manner, a read is performed from the memory array 32 so that the remaining bytes are provided from the EDC 82, combined with the valid bytes from the multiplexer 80, and then provided to the multiplexers 78 and 84. To transmit data to the host bus 24 from the memory bus 72, the data is first provided to a 128-bit host-to-memory read latch 100, having the upper 64 bits of its output connected to a first set of inputs of a host bus data multiplexer 102, and the lower 64 bits connected to a second set of inputs of the host bus data multiplexer 102. A third set of inputs of the host bus data multiplexer 102 is connected to a 64-bit EISA bus-to-host read latch 104 which receives data from an EISA transceiver 106. The host bus data multiplexer 102 selects which 64 bits of data will be transmitted to a 64-bit buffer 108 having its output connected to the host bus 24 to drive data onto the host bus 24.

The output of the EDC circuit 82 is also provided to one input of an EISA bus-to-memory read multiplexer 110 having two sets of inputs composed of 128 bits each. The second set of inputs of the multiplexer 110 receives data from the multiplexer 96. The output of the EISA bus-to-memory read multiplexer 110 is connected to the inputs of a secondary read data buffer 112, which preferably receives the data from the multiplexer 110 in two sets of 128 bits for a total of 256 bits. The secondary read data buffer 112, therefore, is preferably 256 bits wide and has two latch enable bits referred to as EMRDLES<1..0>, respectively, to latch the data from two cycles from the multiplexer 110. The secondary read data buffer 112 provides its output to the input of a 256-bit primary read data buffer 113. The primary and secondary read data buffers form the read data portion of the double buffer in the preferred embodiment. The primary read data buffer 113 receives a latch enable signal, referred to as PL, which latches the 256 bits of data from the secondary read data buffer 112. The primary read data buffer 113 has its output connected to the input of an EISA read multiplexer 114. The EISA read multiplexer 114 then transmits data to the EISA transceiver 106 in 32-bit sets. The data provided to the transceiver 106 is transmitted to the EISA bus 42.

Data to be transmitted to the memory bus 72 from the EISA bus 42 is loaded into the transceiver 106 and provided to a 288-bit primary write data buffer 124, 32 bits at a time. The primary write data buffer 124 includes 8 latch enables referred to as EMWTLEP<7..0>, respectively, corresponding to eight 32-bit buffers within the primary write data buffer 124. The SDB 44 includes logic to determine which of the EMWTLEP<7..0> latch enable signals are to be asserted, which further depends upon the address asserted on the EISA bus 42. The 32 byte valid bits are provided to the remaining 32 bits the primary write data buffer 124. The outputs of the primary write data buffer 124 are provided to corresponding inputs of a 288-bit secondary write data buffer 125, which receives a latch enable signal referred to as SL to latch data from the primary write data buffer 124 to the secondary write data buffer. The outputs of the secondary write data buffer 125 are provided to a second set of inputs of the multiplexer 80.

Data to be transferred from the host bus 24 to the EISA bus 42 is latched into a 64-bit host-to-EISA write latch 116 connected through a 64-bit buffer 118 to the host bus 24. Data is then transmitted to a host-to-EISA write multiplexer 120, which transmits data to an EISA assembly latch 122 in 32-bit sets. The assembly latch 122 then transmits the data to the transceiver 106 to be provided to the EISA bus 42. The inputs of the assembly latch 122 are also connected to the outputs of the transceiver 106 for EISA byte assembly.

To transfer data from the EISA bus 42 to the host bus 24, data from the EISA bus 42 is received by the transceiver 106 and provided in sets of 32 bits to the EISA bus-to-host read latch 104. The EISA bus-to-host read latch 104 is a 64-bit latch, which is connected to the third input of the host bus data multiplexer 102. As previously indicated, the multiplexer 102 transmits data to the host bus 24 through the 64-bit buffer 108.

Data to be transmitted to the memory bus 72 from the host bus 24 is loaded in 64-bit sets into a set of four host-to-memory write latches 126, 128, 130 and 132. The host-to-memory write latches 126, 128, 130 and 132 receive data from the host bus 24 and transmit the data to a second input of the multiplexer 80. Also 8 byte valid bits are provided to each of the latches 126, 128, 130 and 132 indicating the valid bytes as described previously. The four 8-byte valid bits are combined to form a second set of 32 byte valid bits from the host bus 24. Using the select input of the multiplexer 80, the computer system C indicates which bus data is to be transferred to the memory bus 72.

Figure 3A:
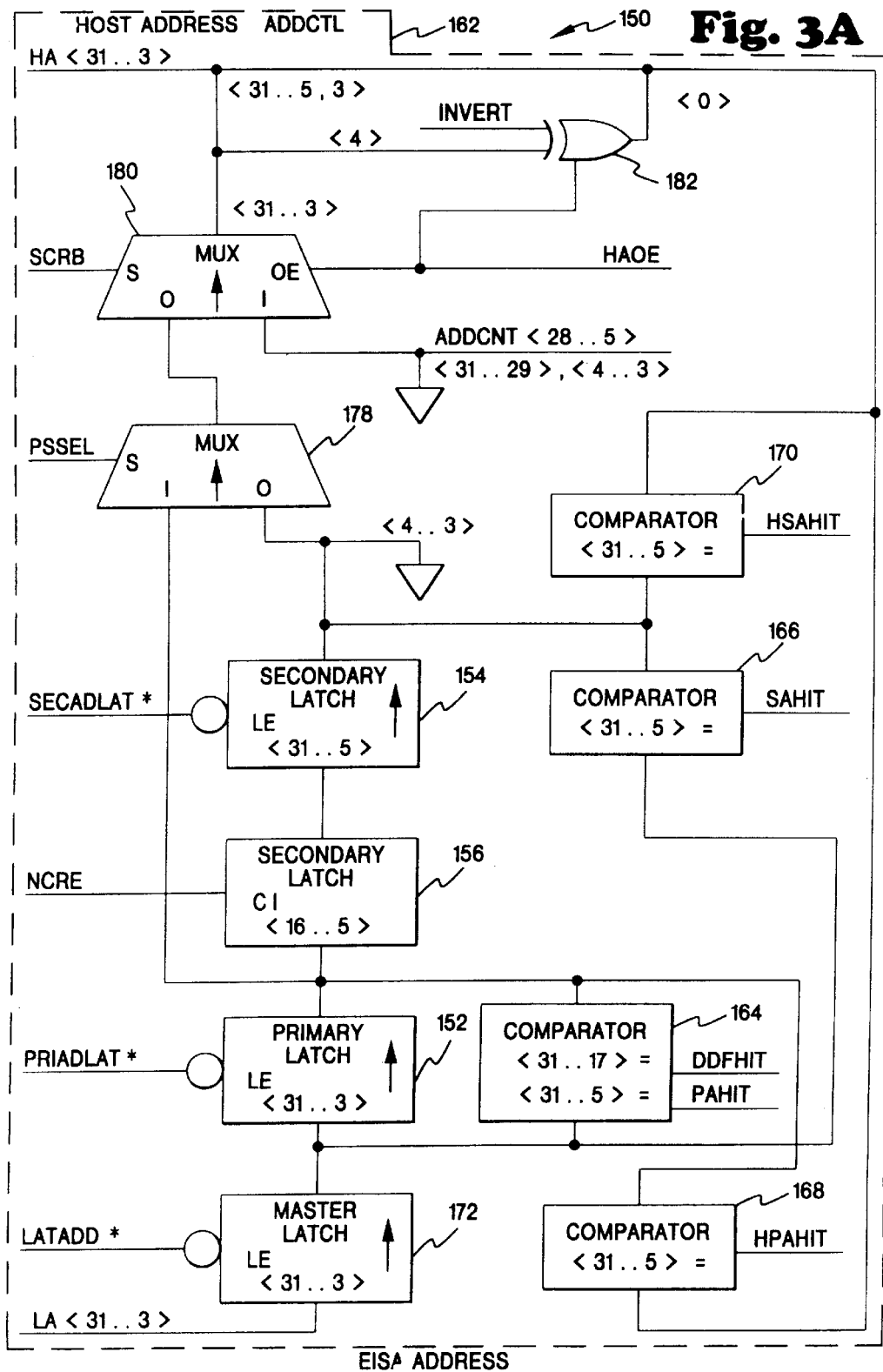
FIGS. 3A,3B are a block diagram of EISA host master logic incorporated within the memory controller of FIG. 1 which is used to control the double buffers within the SDB of FIGS. 2A,2B.
Figure 3B:
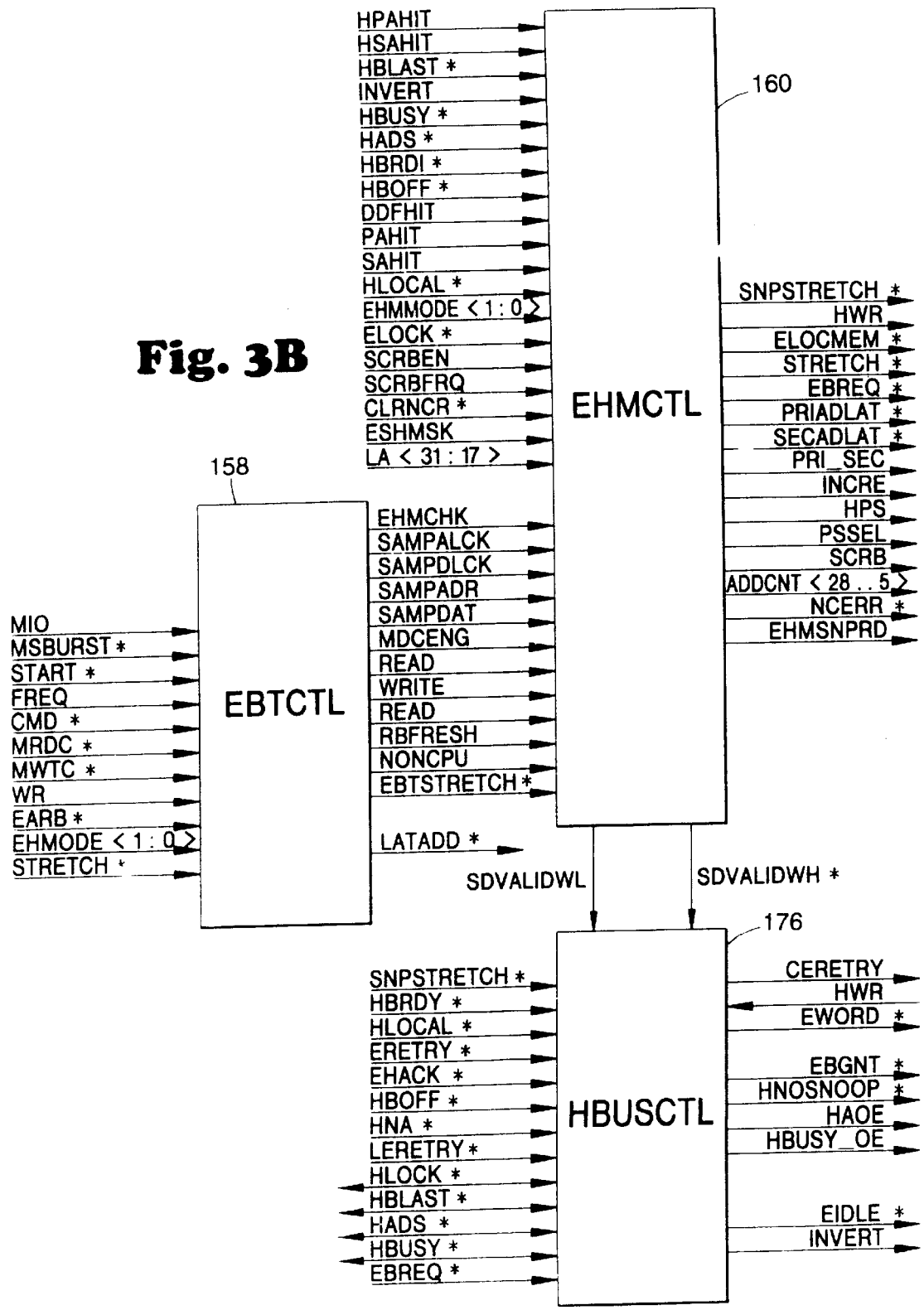

Referring now to FIGS. 3A and 3B, a block diagram is shown illustrating EISA host master (EHM) logic 150, which is incorporated into the memory controller 30 of FIG. 1. The EHM logic 150 runs cycles on the host bus 24 in response to memory accesses initiated on the EISA bus 40 including DMA, RAM refresh and accesses initiated by EISA and ISA bus masters attached to the EISA bus 42. In general, the EHM logic 150 includes an EISA bus tracker (EBTCTL) 158, which is connected to and follows the activity on the EISA bus 42 and provides signals to an EISA host master controller (EHMCTL) 160 to indicate when new addresses are present, or when data is expected to be valid. The EHMCTL 160 is the primary controller for the EHM logic 150, which detects and controls the various memory cycles to and from the memory array 32. The EHMCTL 160 includes control signals, described further below, which are used to control the primary and secondary read and write data buffers 112, 113, 124 and 125 in the SDB 44. Address control logic (ADDCTL) 162 latches primary and secondary addresses corresponding to the primary and secondary data buffers 112, 113, 124 and 125, compares the primary and secondary addresses to the current EISA address generating address flags, and receives strobe and control signals from the EHMCTL 160 and a host bus controller (HBUSCTL) 176. The HBUSCTL 176 monitors and controls all access of the host bus 24 by the EHM logic 150.

The EBTCTL 158 supports normal EISA cycles, RAM refresh cycles, 32-bit EISA burst cycles and ISA cycles, which are all described more fully below. The EBTCTL 158 generates two strobe signals referred to as SAMPADR and SAMPDAT, which are address and data trigger mechanisms, respectively, provided to the EHMCTL 160. The SAMPADR and SAMPDAT strobes are synchronous pulses which are gated with the START* and CMD* signals residing on the EISA bus 42 at times when they are guaranteed to be stable, and in time for the EHMCTL 160 to stretch a clock signal referred to as BCLK residing on the EISA bus 42 if the EHMCTL 160 is not ready to continue. The START* signal indicates the beginning of an EISA cycle after an EISA address becomes valid, which is negated after one nominal BCLK period. The CMD* signal provides data timing control for the EISA bus 42 and is asserted low simultaneously as the START* signal is negated, and remains asserted until the nominal end of the EISA cycle. The BCLK signal is the main clock signal for the EISA bus 42, which preferably operates at approximately 8.333 MHz. The low portion of the BCLK signal is stretched by the EBC 40 upon the assertion of a signal referred to as STRETCH*, which is asserted by the EHMCTL 160, described further below.

The equations for the SAMPADR and SAMPDAT strobes are as follows:

```
SAMPADR  =  M25 & (START* + (CMD* & MSBURST*)) &
            SBCLK2
         +  M33 & (START* & (CMD* & MSBURST*)) &
            SBCLK3
         +  SMRDC & ISA
         +  SMWTC & ISA
SAMPDAT  =  CMD* & M25 & SBCLK2
         +  CMD* & M33 & SBCLK3
         +  SMRDC & ISA
         +  SMWTC & ISA
``` where the "&" symbol denotes the logical AND operation and the symbol "+" indicates the logical OR operation. A signal SBCLK2 is a clock signal which is one HCLK period in duration and can be sampled asserted on the occurrence of the second HCLK signal after the BCLK signal is asserted. A signal SBCLK3 is the same as the SBCLK2 signal delayed by one HCLK. A signal referred to as ISA is asserted only in ISA bus master mode, where the mode is indicated by mode signals referred to as EBMODE<1..0>. The EISA bus mode is indicated by the EBMODE<1..0> signals which are provided from the EBC 40 to indicate which type of master currently has control of the EISA bus 42. The EBMODE< > signals equal 00 if the master is the CPU, 01 if the master is a refresh controller, 10 if the master is an ISA master and 11 if the bus master is an EISA or DMA bus master. A signal M25 is asserted for non-CPU cycles operating in 25 MHz mode, and a signal M33 is asserted for non-CPU cycles when operating in 33 MHz mode. Two signals referred to as SMRDC and SMWTC correspond to the ISA memory read and write control strobes MRDC* and MWTC*, respectively, except synchronized with the falling edge of HCLK in the 25 MHz mode and with the rising edge of the HCLK in the 33 MHz mode. A signal MSBURST* is an EISA bus master burst signal, which is asserted low when the bus master can support a burst cycle as the next cycle. The MSBURST* signal is used by the memory controller 30 to track cycles on the EISA bus 42.

The EBTCTL 158 receives a memory I/O signal, referred to as MIO, and a read/write signal, referred to as WR, to determine whether memory read or write cycles are indicated. The EBTCTL 158 provides three strobes to the EHMCTL 160, referred to as READ, WRITE and REFRESH to indicate read, write and refresh cycles, respectively, which are defined as follows:

WRITE=EISAMODE & WR+ISAMODE & MWTC*
READ=EISAMODE & ~WR+ISAMODE & MRDC*
REFRESH REFRESHMODE+CPUMODE & DHOLD
   & ELOCK* & ~BRKLCKFLG where EISAMODE, ISAMODE, REFRESHMODE and CPUMODE are determined from the EBMODE< > signals, a BRKLCKFLG flag is set when a RAM refresh cycle is triggered in the CPU mode, and cleared whenever a signal DHOLD or a signal ELOCK* is sampled at the rising edge of the BCLK signal, thus causing only one RAM refresh cycle when both of the DROLD and ELOCK* signals are asserted together. The ELOCK* signal is an EISA lock signal giving a device exclusive access to the EISA bus.

Two other strobes, referred to as SAMPALCK and SAMPDLCK, are generated by the EBTCTL 158 to trigger the EHMCTL 160 to sample the ELOCK* signal. The SAMPALCK signal is active for one HCLK period after the SAMPADR signal is active in DMA mode. The SAMPDLCK signal is active for one HCLK period after the SAMPDAT signal is asserted in DNA mode. This is required due to the long setup requirement of the ELOCK* signal in the EISA specification. The EBC 40 delays the BCLK signal one HCLK period if the ELOCK* signal is first sampled active with the SAMPDLCK signal, allowing the ELOCK* signal to properly setup to the EHM logic 150 and determine if the STRETCH* signal should be asserted. If the ELOCK* signal is first sampled active with the SAMPALCK signal, the EBC 40 does not delay the BCLK signal since the STRETCH* signal can be asserted during the CMD* portion of the EISA cycle. A signal EBTSTRETCH* is the ISA bus master stretch signal. During ISA cycles, the EBTSTRETCH* signal is active low when the SAMPADR signal is active high. The EBTSTRETCH* signal is ANDed with other stretch signals within the EHMCTL 160, which allows the EBC 40 to assert a signal CHRDY with the MWTC* or the MRDC* signals, and to negate the CHRDY signal when the STRETCH* signal is negated high, thus avoiding a race condition with the CHRDY signal. Eight and 16-bit ISA input/output (I/O) and memory slaves negate the CHRDY signal to control the bus controller wait state timing as known to those skilled in the art.

The ADDCTL 162 includes a master latch 172, which receives the EISA bus 42 address signals, referred to as the LA<31..3> address signals, at its input. The LA<31..3> signals may also be referred to generally as the LA< > signals. The master latch 172 is latched with a signal LATADD* provided by the EBTCTL 158. When the LATADD* signal is asserted low, the master latch 172 is transparent so that the signals at its input are asserted at its output. The master latch 172 is provided since stretched burst cycles will not hold an EISA address valid. Therefore, during burst cycles, the master latch 172 latches data when the LATADD* signal is strobed high then low, thereby latching the present EISA address. The master latch 172 is open for all non-burst cycles since the EISA address is held with the STRETCH* signal. The outputs of the master latch 172 are connected to the inputs of a primary address latch 152 corresponding to the primary read and write data buffers 113 and 124. The outputs of the master latch 172 are also provided to a secondary address latch 154, which corresponds to the secondary read and write data buffers 112 and 125 within the SDB 44.

The primary address latch 152 receives a latch control signal PRIADLAT* signal from the EHMCTL 160, where the primary address latch 152 is transparent when the PRIADLAT* signal is asserted low, and latched when the PRIADLAT* signal is negated high. The secondary address latch 154 receives a signal SECADIAT* from the EHMCTL 160, which operates the same way as the PRIADLAT* signal. The ADDCTL 162 includes increment logic 156 coupled to the output of the primary address latch 152 and to the input of the secondary address latch 154, where the increment logic 156 receives a signal INCRE from the EHMCTL 160. The increment logic 156 is transparent when the INCRE signal is low, and increments its input and provides an incremented address at its output when the INCRE signal is asserted high. Thus, the input of the secondary address latch 154 receives a primary address from the primary address latch 152 when INCRE is low and an incremented version of the primary address when INCRE is high. An address latched into the secondary address latch 154 is referred to as the secondary address.

The EHM logic 150 also compares the EISA addresses signals LA<31..3> on the EISA bus 42 with addresses latched in the primary and second address latches 152 and 154, monitors EISA read and write cycles to determine which buffers have or need valid data, and runs cycles on the host bus 24 to load the primary and secondary read data buffers 112 and 113 or to empty the primary and secondary write data buffers 124 and 125 within the SDB 44. A comparator 164 receives and compares the outputs of the master latch 172, representing the LA<31..3> EISA address signals, and also receives the outputs primary address latch 152, and generates two flag signals referred to as DDFHIT and PAHIT.

A comparator 166 receives the outputs of the secondary address latch 154 and compares it to the LA<31:5> EISA address signals and provides a flag signal referred to as SAHIT. A comparator 168 receives the output of the primary address latch 152 and compares it to the HA<31..5> host address signals of the host bus 24, and provides a corresponding flag signal referred to as HPAHIT. A comparator 170 receives the HA<31..5> host address signals and compares them to the output of the secondary address latch 154, providing a corresponding flag signal referred to as HSAHIT. The DDFHIT, PAHIT, SAHIT, HPAHIT and HSAHIT signals are defined as follows:

```
DDFHIT = (PA[31:17] == LS[31:17])
PAHIT  = DDFHIT & (PA[16:6] == LA[16:6]) &
         ((BL64 * -LHLOCMEM*) +
         (PA[5] == LA[5]))
SAHIT  = DDFHIT & (SA[16:6] == LA[16:6]) &
         ((BL64 & -LHLOCMEM*) +
         (SA[5] == LA[5]))
HPAHIT = (PA[31:6] = HA[31:6] &
         (BL64 + (PA[5] = LA[5]))
HSAHIT = (SA[31:6] == HA[31:6] &
         (BL64 + (SA[5] = HA[5]))
``` where PA and SA denote the outputs of the primary and secondary address latches 152 and 154, respectively, the "==" symbol denotes corresponding bits of the indicated latches are equal, and the "~" symbol denotes logical negation. A signal BL64 signal is a 64 byte line flag and a signal LHLOCMEM* is the latched version of a signal HLOCMEM* which is used for the current DDF page. Thus, the DDFHIT signal determines if an EISA address is within the same DDF page as the current primary address, where a DDF page is preferably 128 kbytes in length. The PAHIT signal determines whether the EISA address is within the same line as indicated by the primary address, where a line is preferably 256 bits. The SAHIT signal determines whether the EISA address is within the same line as the secondary address. The HPAHIT and HSAHIT signals determine if a host bus master such as the CPU 20 or 22, is accessing an address within the same line as the primary or secondary addresses, respectively, corresponding to data within the primary or secondary read and write data buffers 112, 113, 124 and 125 of the SDB 44. The HPAHIT and HSAHIT are used by snoop hit interrupt logic (ESHI, not shown), which snoops host bus cycles to determine if a CPU accesses a location which is currently buffered in the data buffers of the SDB 44. A snoop read hit occurs, as indicated by a signal SNP-READ-HIT, if the following condition is met:

SNP-READ-HIT =:  ~HADS* & LHADS & ~HWR & PWDATVAL &
                 HPAHIT + ~HADS* & LHADS & ~HWR &
                 SWDATVAL & HSAHIT where ~HADS* & LHADS indicates that the HADS* signal was asserted then negated, PWDATVAL indicates valid data in the primary write data buffer 124, HWR is the host read/write signal and SWDATVAL indicates valid data in the secondary write data buffer 125. If a snoop read hit occurs, the ESHI logic will assert a signal NCERR* to cause a non-maskable interrupt (NMI), and hold it asserted until the error indication is read.

A snoop write hit occurs, as indicated by a signal SNP-WRITE-HIT, if the following condition is met:

SNP-WRITE-HIT =:  ~HADS* & LHADS & HWR & PRDATVAL &
                  HPAHIT + ~HADS* & LHADS & ~HWR &
                  SRDATVAL & HSAHIT where PRDATVAL indicates valid data in the primary read data buffer 113 and SRDATVAL indicates valid data in the secondary read data buffer 113. If a write hit occurs, the ESHI logic marks the read buffers invalid, but otherwise it will continue normal operation without causing an interrupt or any other indication.

The ADDCTL 162 includes a multiplexer 178 which receives the outputs of the primary address latch 152 at one input and the output of the secondary latch 154 at its other input. A signal PSSEL is a primary or secondary select signal asserted by the EHMCTL 160, which is provided to the select input of the multiplexer 178. When the PSSEL signal is low, the secondary address is provided and when high, the primary address is provided at the output of the multiplexer 178. The output of the multiplexer 178 is provided to one input of a multiplexer 180, which has its other input connected to scrub cycle address signals referred to as ADDCNT <28..5>, where the remaining bits <31..29,4..3> are grounded. The ADDCNT< > address signals are used to implement scrub operations, described further below.

A signal SCRB is provided by the EHMCTL 160 to the select input of the multiplexer 180, so that if the SCRB signal is low, the output of the multiplexer 178 is selected and when the SCRB signal is high, the ADDCNT< > signals are selected. The multiplexer 180 also includes an output enable input which receives a signal HAOE from the HBUSCTL 176. The outputs of the multiplexer 180 are connected to the HA<31..3> host bus address signals. The outputs of the multiplexer 180 are tri-stated when the HAOE signal is low, and driven with the selected input of the multiplexer 180 when high. An exclusive-OR tri-statable buffer 182 has one input connected to a signal INVERT and another input connected to the LA<4> address signal, and its output connected to LA<4> address signal. The HAOE signal is connected to an enable input of the exclusive-OR buffer 182, so that its output is tri-stated when the HAOE signal is low, and drives the HA<4> signal when the HAOE signal is asserted high. This is used for certain memory to host bus operations.

The EHMCTL 160 is the main controller for the entire EHM logic 150 which controls and detects read, write, RAM refresh, local, non-local and scrub memory cycles. The SAMPADR and SAMPDAT strobes from the EBTCTL 158 indicate to the EHMCTL 160 to sample the READ, WRITE and REFRESH strobes provided by the EBTCTL 158. These strobes determine the type of cycle to run on the host bus 24, where the cycle types are defined by the following equations:

~SAMPADR & WRITE=EHM host bus write cycle

~SAMPADR & READ=EHM host bus read cycle

~SAMPADR & REFRESH=EHH host memory RAM refresh cycle

The EHMCTL 160 receives the DDFHIT, the PAHIT, the SAHIT, the HPAHIT and the HSAHIT address flag signals from the ADDCTL 162. The EHMCTL 160 latches the appropriate address, stretches the BCLK signal if necessary, locks the host bus 24 if required, triggers the SDB 44 to move data from the primary write data buffer 124 to the secondary write data buffer 125 and from the secondary read data buffer 112 to the primary read data buffer 113, generates the ADDCNT< > scrub cycle addresses, and also generates a signal referred to as EBREQ* used to request access to the host bus 24. The EHMCTL 160 asserts a signal PL2SL* to the SDB 44, which asserts the PL and SL signals in response to load the primary read buffer 113 and the secondary write buffer 125.

An arbitration circuit (not shown) within the memory controller 30 receives the EBREQ* signal, prioritizes other requests for the host bus 24, and provides a signal EHACK* to the HBUSCTL 176 indicating that the EHM logic 150 has won control of the host bus 24. For every initial write or read cycle, the EHMCTL 160 latches the HA< > EISA address into the primary address latch 152 and the incremented or unincremented address into the secondary address latch 154 by asserting the PRIADLAT* and SECADLAT* signals. The EHMCTL 160 asserts the INCRE signal high for read cycles and low for write cycles. The EHMCTL 160 also snoops the DDF logic within the memory mapper 34 and latches the HLOCAL* signal on the first rising edge of the HCLK signal after a signal HADS* is sampled active, to generate the ELOCMEM* signal. The HADS* signal is a start cycle indicator residing on the host bus 24, which indicates that a new address is valid and asserted on the host bus 24. If a host bus cycle is initiated with either the DDFHIT negated low or if the primary address latch 152 is open indicated by the PRIADLAT* signal asserted low, then the ELOCMEM* signal is driven to a determined level until the DDF information is available.

The EHMCTL 160 also generates two status signals referred to as HPS and HWORD*. The HPS signal indicates whether the SDB 44 should fill the primary read data buffer 113 or the secondary read data buffer 112. The HWORD* signal is used to distinguish between write snoops and real write cycles by the EHM logic 150, where the HWORD* signal is negated high for write snoops and asserted low to indicate write cycles initiated on the EISA bus 42 to the memory array 32.

Figure 4:
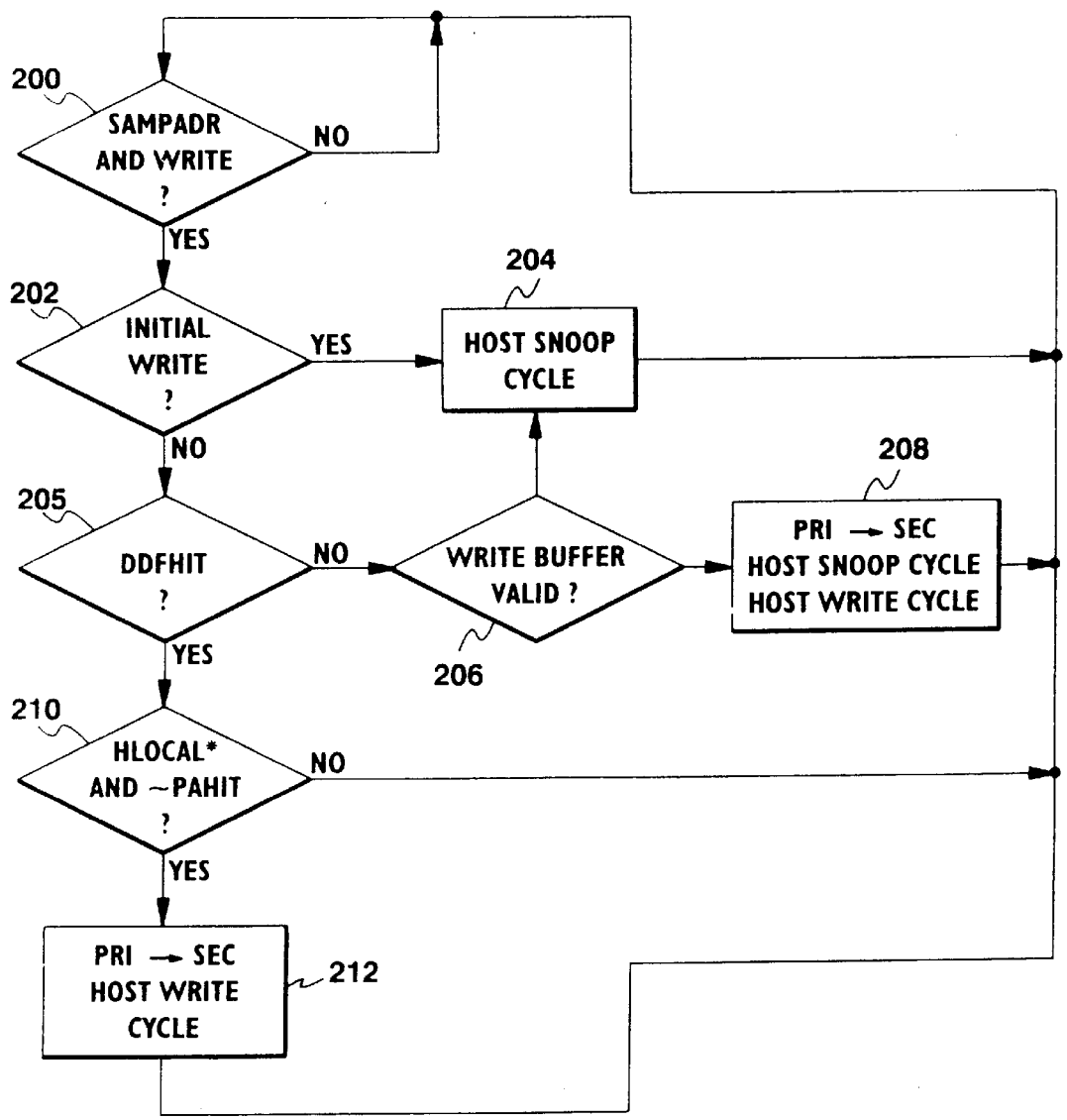
FIG. 4 is a flowchart diagram illustrating write cycles initiated on the EISA bus to the main memory of FIG. 1, using double buffered operations according to the present invention.

Referring now to FIG. 4, a flowchart is shown illustrating write cycles to memory from the EISA bus 42. In a step 200, the SAMPADR and WRITE strobes are detected asserted indicating a write cycle from the EISA bus 42 to the memory array 32 is to be performed. If so, operation proceeds to a step 202 where it is determined whether the write cycle is an initial write cycle which is indicated by the DDFHIT and PAHIT signals being undefined as indicated by other circuitry. If an initial write is indicated, operation proceeds to a step 204 where a host snoop cycle is performed. The host snoop cycle, otherwise referred to as a DDFSNOOP cycle, is executed to determine if the new EISA address within the new DDF page is contained within the memory array 32 as determined by the HLOCAL* signal provided by the DDF logic in the memory mapper 34, and from step 204, operation returns to step 200.

If the write cycle is not an initial write cycle in step 202, operation proceeds to a step 205 to where the EHMCTL 160 determines if the DDFHIT signal is asserted. If the DDFHIT signal is not asserted, then a DDF page miss has occurred where the new EISA address is not in the same 128 kbyte DDF page as the primary address, and operation proceeds to a step 206 where the primary write data buffer 124 is checked to determine if it contains valid data. If the primary write data buffer 124 does not contain valid data in step 206, operation proceeds to step 204 to perform the host snoop cycle for the new EISA address to a new DDF page. Otherwise, if the primary write data buffer 124 contains valid data in step 206, operation proceeds to a step 208 where the EHMCTL 160 asserts the PL2SL* signal to transfer data from the primary write data buffer 124 to the secondary write data buffer 125. Then, a host snoop cycle is executed on the host bus 24 to determine if the new EISA address to a new DDF page is in the memory array 32. Then, another write cycle is executed on the host bus 24 to write the data within the secondary write data buffer 125 to the memory array 32. From step 208, operation returns to step 200.

If the DDFHIT signal is true in step 205, operation proceeds to a step 210 where the HLOCAL* and the PAHIT signals are monitored. The HLOCAL* signal indicated in step 210 is a latched version of the HLOCAL* signal from the preceding write cycle. If the HLOCAL* signal is negated high in step 210, then the write cycle is not to the memory array 32 since it is in the same DDF page as the previous write cycle and operation returns to step 200. Also, if the PAHIT signal is true in step 210, the SDB 44 loads the primary write data buffer 124 with the new data and sets the proper byte valid bits, and operation returns to step 200. In this manner, the EHMCTL 160 and the SDB 44 continue loading the primary write data buffer 124 before executing a cycle on the host bus 24 to write the data into the memory array 32.

In step 210, if the HLOCAL* signal is asserted low and if the PAHIT signal is negated, so that the new address is not within the same line as the primary address, operation proceeds to step 212 where the EHMCTL 160 asserts the PL2SL* signal causing the SDB 44 to shift the data from the primary write data buffer 124 to the secondary write data buffer 125, and then a write cycle is executed on the host bus 24 to write the data from the secondary write data buffer 125 to the memory array 32. Also, the data from the current EISA cycle is written into the primary data buffer 124 where a corresponding one of the EMWTLEP<7..0> latch enable signals is asserted by the SDB 44. At the completion of the write cycle, the EHMCTL 160 asserts the SECADLAT* signal low to open the secondary address latch 154 in order to set up the correct address for the next write cycle to the memory array 32. From step 212, operation proceeds back to step 200.

Figure 5:
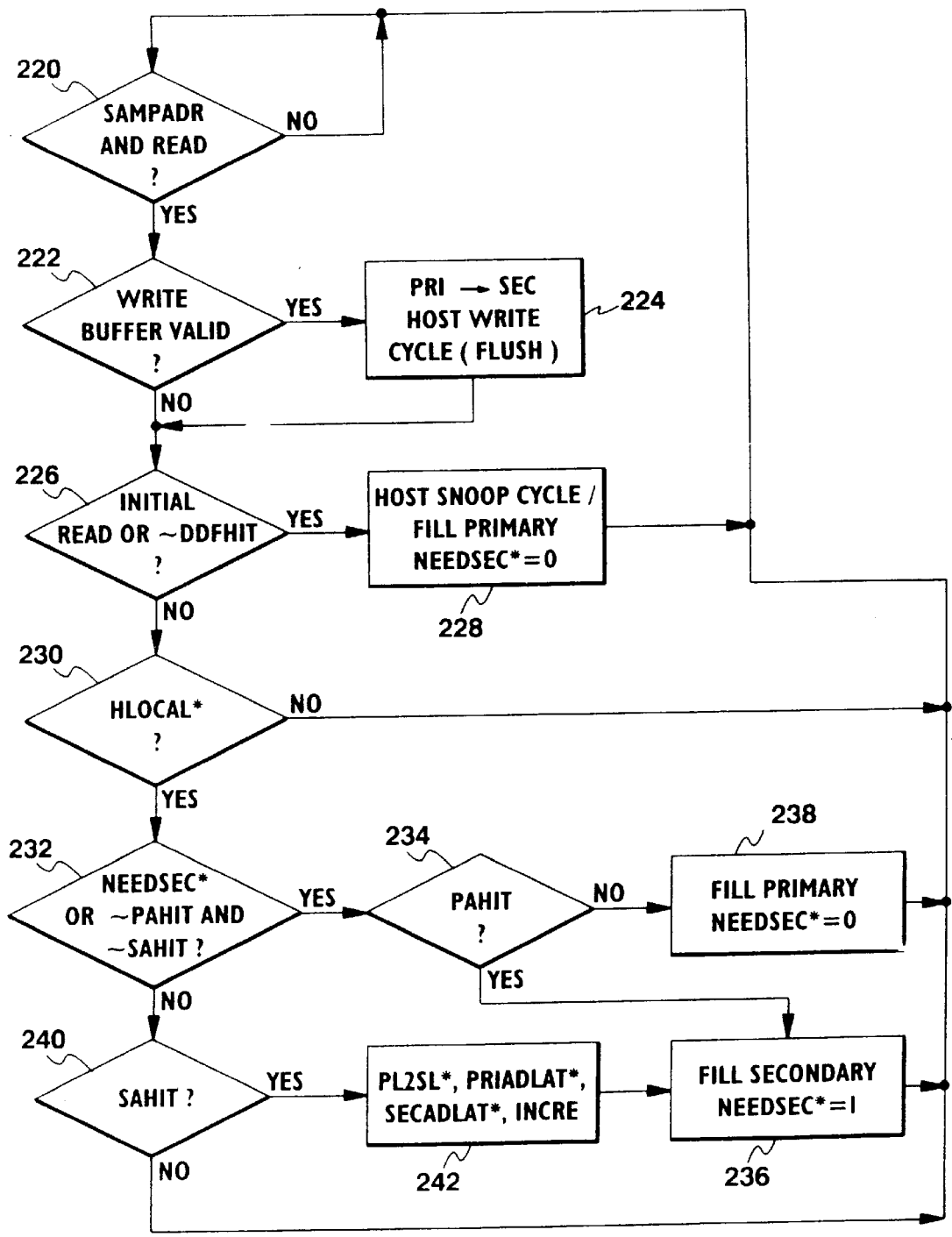
FIG. 5 is a flowchart diagram illustrating read cycles initiated on the EISA bus to the main memory of FIG. 1, using double buffered operations according to the present invention.

Referring now to FIG. 5 a flowchart diagram is shown illustrating EISA to host read cycles initiated by a device on the EISA bus 42. Operation begins at a step 220 where the SAMPADR and READ strobes indicate a read cycle initiated on the EISA bus 42, so that operation proceeds to a step 222. If not, operation remains in step 220. The primary write data buffer 124 is checked in step 222 to determine if it contains valid data. Any valid data within the primary write data buffer 124 is flushed to the memory array 32 before proceeding with the read operation. This is done in order to insure that the data in the memory array 32 is up-to-date before performing the read operation. Thus, if the primary write data buffer 124 contains valid data, operation proceeds to step 224 where the EHMCTL 160 asserts the PL2SL* signal to transfer data from the primary write data buffer 124 to the secondary write data buffer 125, and a write cycle is initiated on the host bus 24 to flush the data from the secondary write data buffer 125 to the memory array 32.

If the primary write data buffer 124 does not contain valid data in step 222, or after the operations in step 224 are completed, operation proceeds to a step 226 where it is determined whether the read cycle is an initial read or whether a DDF page miss has occurred. In step 226, if an initial read occurs or if a DDF page miss occurs, operation proceeds to a step 228 where a host snoop cycle is executed on the host bus 24 and the primary read data buffer 113 is loaded from the memory array 32 through the secondary read data buffer 112 if the address is to the memory array 32. If the address was one contained in the cache of a CPU, a write back cycle would occur and the data would be received from the cache rather than the memory array 32. If the initial read is not to the memory array 32, no data is loaded. The EISA address in the LA< > signals is latched into the primary address latch 152 in either case. Also in step 228, a flag referred to as NEEDSEC* is set equal to 0 indicating that the secondary read data buffer 112 does not contain valid data. Operation then proceeds back to step 220 from step 228. It is noted that a DDF page miss is treated in a similar manner as an initial read.

If an initial read is not occurring and if the DDFHIT signal is asserted in step 226, operation proceeds to a step 230 where a latched version of the HLOCAL* signal is sampled as discussed previously for step 210. If the HLOCAL* signal is negated in step 230, operation returns to step 220 indicating a read cycle to EISA memory and not to the memory array 32, and where the primary address latch 152 remains closed and does not open again until a mode change occurs or a DDF page miss occurs. The EHMCTL 160 remains idle during non-host read cycles. If the HLOCAL* signal is asserted in step 230, operation proceeds to a step 232 where the NEEDSEC* flag and the PAHIT and the SAHIT signals are sampled. If the NEEDSEC* flag is asserted, or if the PAHIT and SAHIT signals are both not asserted, operation proceeds to a step 234 where the PAHIT signal is again sampled. If the PAHIT signal is asserted in step 234, so that the new EISA address is within the same line as the primary address, operation proceeds to a step 236 from step 234 where a secondary buffer fill cycle occurs, where the secondary read data buffer 112 is filled with data from the memory array 32 (or CPU cache in write back cases). Also in step 236, the NEEDSEC* flag is set equal to 1, and operation proceeds back to step 220. Additionally in step 236, the required data is provided from the primary read data buffer 113.

If the PAHIT signal is negated in step 234, then operation proceeds to a step 238 where the primary read data buffer 113 is filled from the memory array 32, being latched through the secondary read data buffer 112 so that the data within the secondary read data buffer 112 is no longer valid. Thus, in step 238, the NEEDSEC* flag is set equal to 0 and operation returns to step 220.

If the secondary buffer is full so that the NEEDSEC* flag is false, and if either the PAHIT or the SAHIT signals are asserted in step 232, operation proceeds to a step 240 where the SAHIT signal is again sampled. If the SAHIT signal is asserted in step 240, operation proceeds to a step 242 where the EHMCTL 160 asserts the PL2SL* signal causing the SDB 44 to shift the data from the secondary read data buffer 112 to the primary read data buffer 113. The EHMCTL 160 also asserts the PRIADLAT*, the SECADLAT* and the INCRE signals, so that the primary address latch 152 latches the current EISA address, and the current primary address is incremented by the increment logic 156 and provided to the secondary address latch 154. These signals are negated within one or two HCLK periods after being asserted to latch these addresses. Operation then proceeds to step 236 from step 242, where a host bus read cycle is executed to fill the now empty secondary read data buffer 112 and the proper data is provided to the EISA bus. From step 242, operation returns to step 220. If the SAHIT signal is negated in step 240, operation returns to step 220, the SDB automatically providing the data from the primary read data buffer 113.

It is noted that if the ELOCK* signal goes active any time during a host read cycle, the EHMCTL 160 stretches the BCLK signal on the EISA bus 42 and runs another host read cycle if the EHM logic 150 is no longer bus master, or if the secondary read data buffer 112 is full. The host bus 24 is then not given to another master until a non-host memory cycle occurs, or until the ELOCK* signal is negated. If the ELOCK* signal is negated during a write-back cycle, the HLOCK* signal remains asserted until the write-back cycle is completed.

Figure 6:
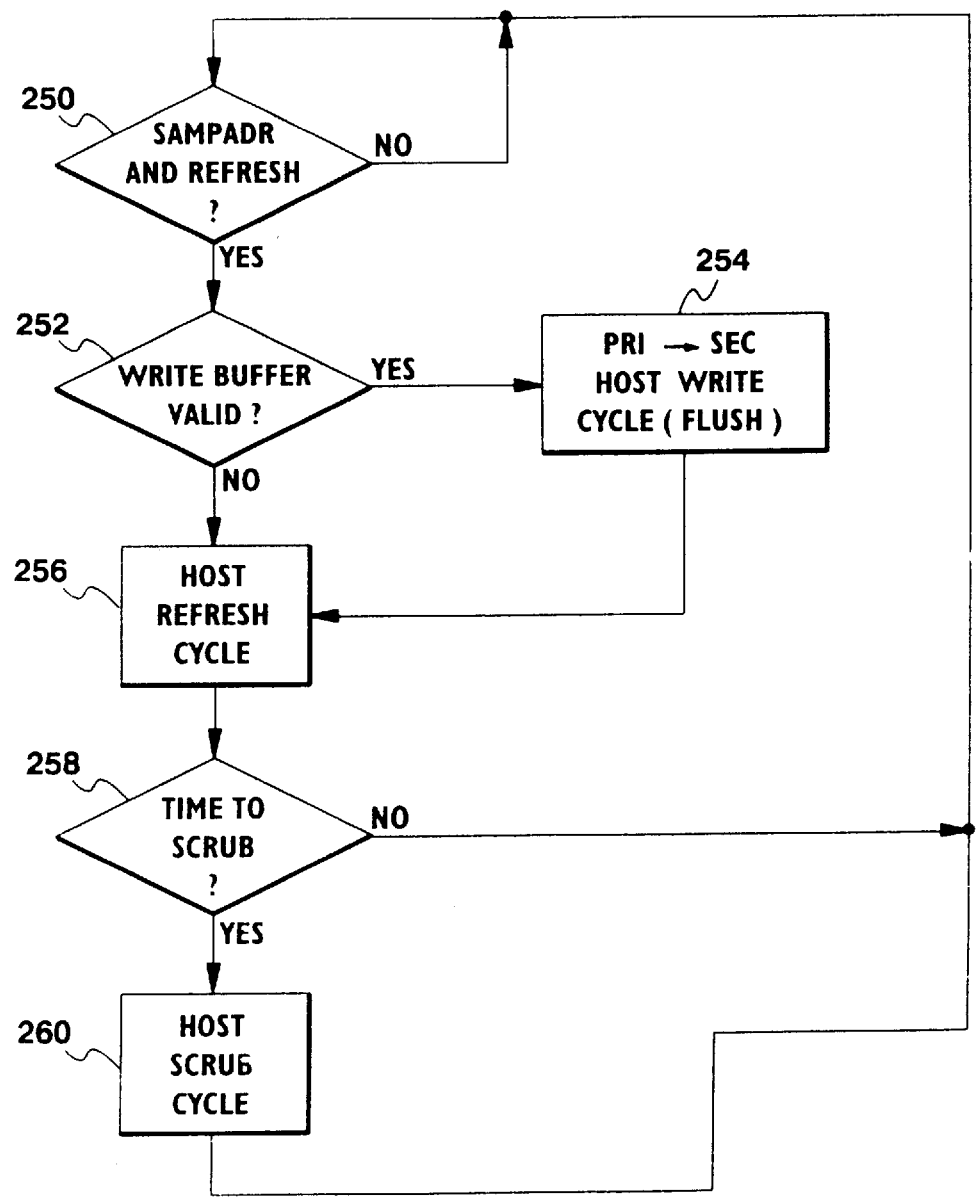
FIG. 6 is a flowchart diagram illustrating a RAM refresh cycle using double buffered operations according to the present invention.

Referring now to FIG. 6, a flowchart diagram is shown illustrating RAM refresh cycles executed on the host bus 24. RAM refresh cycles cause the EHM logic 150 to arbitrate for the host bus 24 and trigger a RAM refresh cycle to the memory array 32. Operation begins in a step 250 where the SAMPADR and the REFRESH strobes are asserted indicating a RAM refresh cycle. If so, operation proceeds to a step 252 where the primary write data buffer 124 is checked for valid data. If valid data exists in the primary write data buffer 124 in step 252, operation proceeds to a step 254 where the PL2SL* signal is asserted to transfer the valid data from the primary write data buffer 124 to the secondary write data buffer 125. Then, a host write cycle is executed to transfer the data from the secondary write data buffer 125 to the memory array 32. If valid data does not exist in the primary write data buffer 124 in step 252, or after the operations of step 254 are completed, operation proceeds to a step 256 where a RAM refresh cycle is executed on the host bus 24. It is noted that the BCLK signal on the EISA bus 42 is not stretched by the EHMCTL 160 unless another non-CPU cycle has been sampled before the previous cycle was completed. From step 256, operation proceeds to a step 258 where it is determined whether a scrub cycle is to be executed. During scrub operations, all the data in the memory array 32 is checked using the EDC 82 to verify the data. This is used to ensure that correctable memory errors are fixed before they become non-correctable errors.

In the preferred embodiment, the scrub cycle mechanism can be disabled or enabled to execute after a certain number of RAM refresh cycles, or may be enabled to execute after every RAM refresh cycle in the preferred embodiment. A scrub counter is used to count the number of RAM refresh cycles to determine when to execute a scrub cycle. Thus, the scrub counter is incremented after every RAM refresh cycle and cleared after every scrub cycle. If a scrub cycle is not to be executed in step 258, operation returns to step 250. Otherwise, operation proceeds to a step 260 from step 258 and the host scrub cycle is executed. Note that if a scrub cycle is executed in step 260, the SCRB signal is asserted so that the ADDCNT <28..5> signals are provided to the host address bus when the HAOE signal is asserted. After the scrub cycle completes in step 260, operation returns to step 250.

Figure 7:
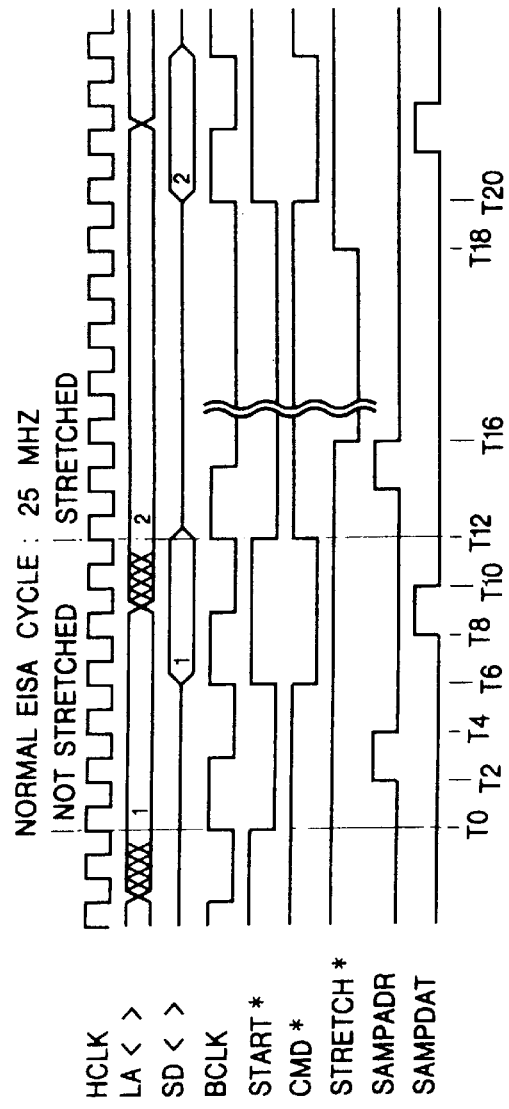
FIG. 7 is a timing diagram. illustrating a normal EISA cycle.

Referring now to FIG. 7, a timing diagram is shown illustrating a normal EISA cycle with a host bus operating at 25 MHz. The HCLK signal is shown at the top of the diagram which operates at 25 MHz. It is noted that two cycles are actually shown where the first cycle is not stretched and the second cycle shows the BCLK signal being stretched. The cycle begins at a time T0 when the LA< > signals become valid and the START* signal is asserted low. The SAMPADR signal is asserted one HCLK later at a time T2 and negated one HCLK period later at a time T4. The falling edge of the SAMPADR strobe is the event which triggers the EHMCTL 160. The START* signal is negated and the CMD* signal is asserted at a time T6, where the data signals of the EISA bus 42, referred to as the SD< > signals, become valid. The SAMPDAT strobe is asserted one HCLK later at a time T8 and remains true for one HCLK period until a time T10 . Again, the falling edge of the SAMPDAT strobe is the triggering event to the EHMCTL 160. The first cycle ends one HCLK period later at a time T12 , when the second cycle begins. Thus, at the time T12 , the START* signal is asserted, the CMD* signal is negated and the LA< > signals again become valid with a new EISA address. The second cycle is similar to the first except that the STRETCH* signal is asserted at a time T16, which is two HCLK periods after the time T12 , and the STRETCH* signal remains asserted until a time T18. Note that while the STRETCH* signal remains asserted, the BCLK signal remains low and is only asserted high after the STRETCH* signal is negated at the time T18. Thus, at a time T20, which is one HCLK period after the time T18, the BCLK and CMD* signals are again asserted and the START* signal is negated to begin the data portion of the cycle.

Figure 8:
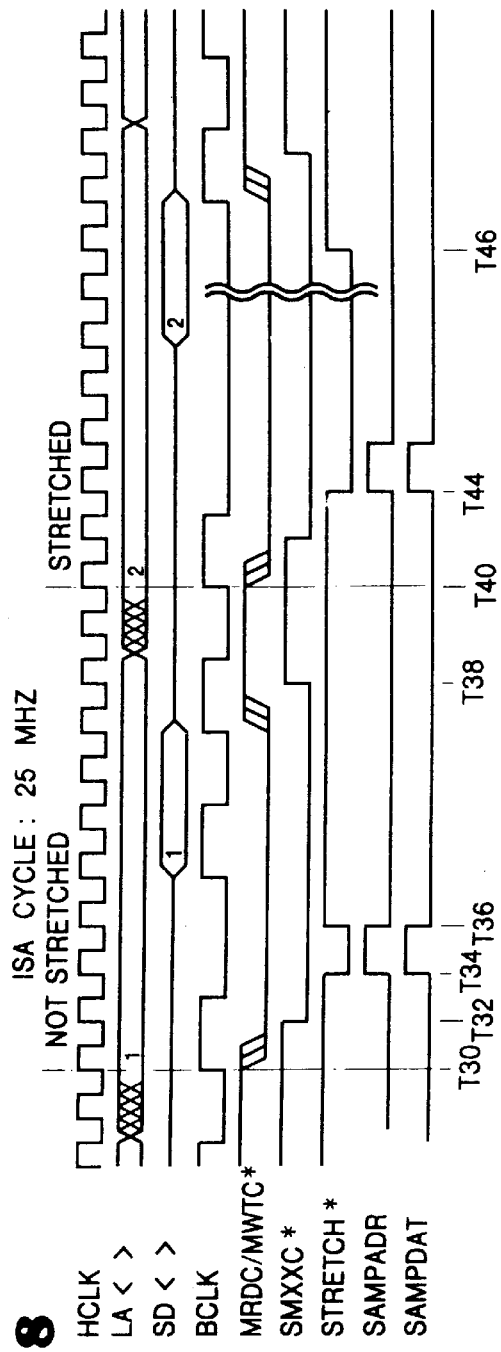
FIG. 8 is a timing diagram illustrating a normal ISA cycle.

Referring now to FIG. 8; a timing diagram is shown illustrating two typical ISA cycles with a host bus operating at 25 MHz. The first cycle is essentially a non-stretch cycle which begins at a time T30 when the LA< > signals become valid. The MRDC* signal or the MWTC* signal is asserted approximately at the time T30 depending upon whether the ISA cycle is a read or a write cycle, and a signal SMXXC* is asserted one HCLK period later at a time T32, where the SMXXC* signal represents the SMRDC or SMWTC signals as previously defined. The SAMPADR and SAMPDAT strobes are asserted together at a time T34 and remain asserted for one HCLK period until a time T36. The cycle essentially completes at a time T38 when the SMXXC* signal is negated. The next cycle begins at a time T40 when the next EISA address on the LA< > signals becomes valid. The second cycle is similar to the first cycle except that the STRETCH* signal is asserted at a time T44, two HCLK periods after the time T40, and remains asserted until a time T46, where the BCLK signal remains low during this time. Note the SAMPADR and SAMPDAT strobes are asserted at the time T44 and remain asserted for one HCLK period in a similar manner as described for the first ISA cycles.

Figure 9A:
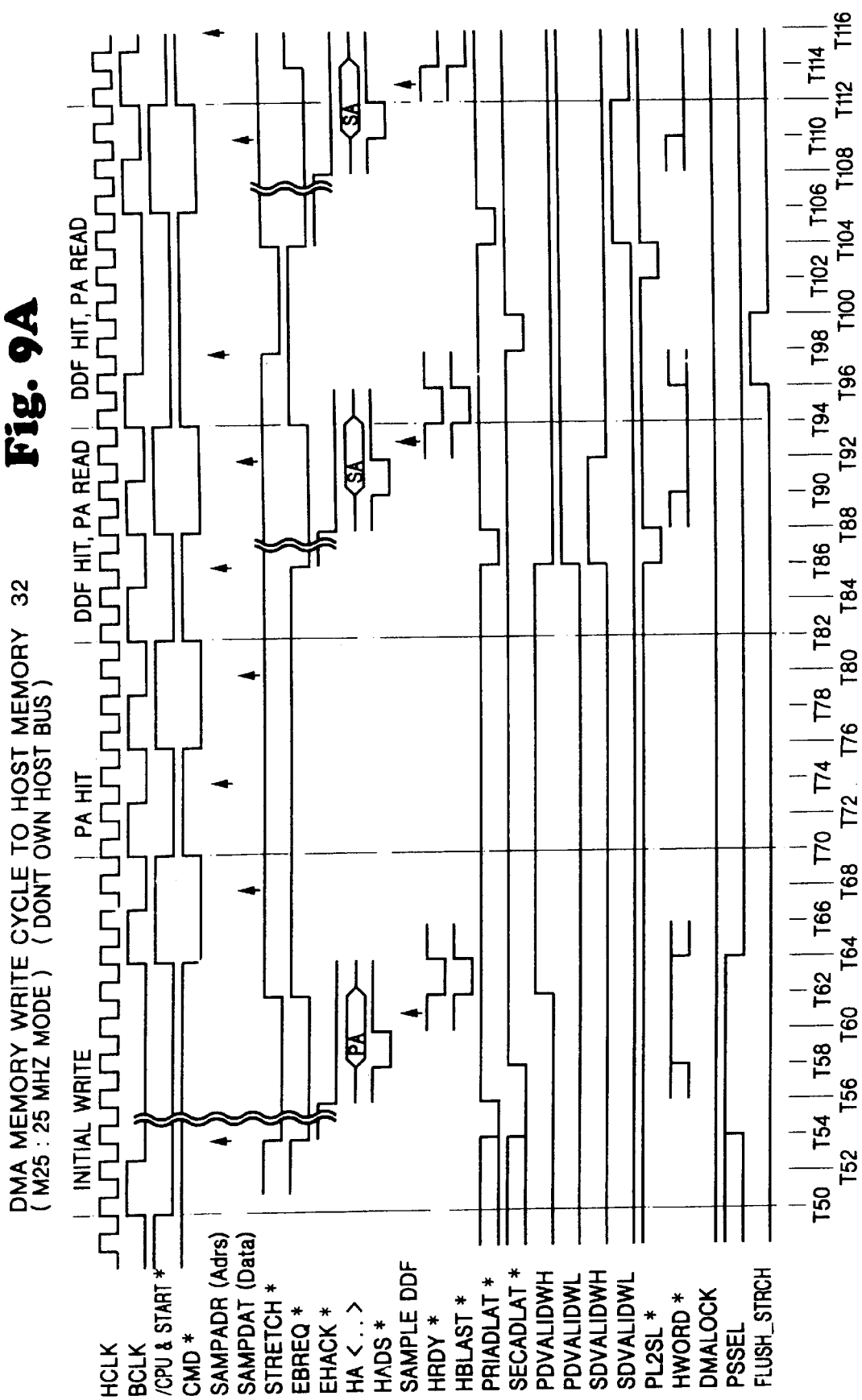

Referring now to FIG. 9A and 9B, timing diagram is shown illustrating DMA memory write cycles to the memory array 32 at 25 MHz. The DMA controller 47 within the CSP 46 is used for illustrating the EISA cycles, since it is implemented to operate as a true EISA bus master. Operation begins at a time T50 when the START* signal is asserted low and when a signal CPU is negated indicating a non-CPU bus master. The falling edge of the SAMPADR strobe is detected at a time T54, which is two HCLK periods after the time T50, and which is indicated by an up arrow on the timing diagram. The STRETCH*, PRIADLAT*, EBREQ* and SECADLAT* signals are all asserted low at the time T54 by the EHMCTL 160. The EHMCTL 160 also asserts the PSSEL signal high to select the primary address from the primary address latch 152. The STRETCH* signal remains low until the EHM logic 150 becomes the bus master of the host bus 24 to perform its host snoop cycle on the host bus 24, and remains low until after the output of the DDF logic within the memory mapper 34 indicates whether the address is to the memory array 32. This is indicated by a signal SAMPLE DDF shown as an up arrow in the timing diagrams. This is when the HLOCAL* signal is sampled as provided by the memory mapper 34. Eventually, the EHACK* signal is negated giving the EHM logic 150 the host bus 24, which occurs at a time T56. The time T56 is not necessarily one HCLK period after the time T54. In effect, the BCLK signal is stretched until the EHM logic 150 gains control of the host bus 24 to perform the host snoop cycle. The PRIADLAT* signal is negated high at the time T56 to latch the EISA address. The SECADLAT* signal is negated high one HCLK period later at a time T58 to latch the secondary address, and the HADS* signal is asserted low at the time T58 indicating the start of the cycle on the host bus 24. When the HADS* signal is asserted low at the time T58, the HAOE signal is also asserted by the HBUSCTL 176, thus driving the HA< > signals with the primary address from the primary address latch 152. The cycle is stretched until the DDF is sampled which occurs after a time T60 and before a time T62, each which occur after consecutive HCLK periods after the time T58.

The cycle is a local cycle to the memory array 32 since the HLOCAL* signal is asserted, although not shown in the timing diagrams. At the time T62, the cycle on the host bus 24 is completed by the assertion of both the HRDY* and HBLAST* signals, when the address appearing on the HA< > signals are no longer valid. The HRDY* and HBLAST* signals are asserted high one HCLK period later at a time T64, where the PSSEL signal is negated and the CMD* signal is asserted low, indicating the data portion of the cycle on the EISA bus 42. The SAMPDAT strobe causes the SD< > data signals from the EISA bus 42 to be latched at a time T68, which is two HCLK periods after the time T64, also indicated by an up arrow. The data from the EISA bus 42 is latched through the transceiver 106 and into the primary write data buffer 124. This initial EISA write cycle ends and a new cycle begins at a time T70, which is one HCLK period after the time T68, when the START* signal is again asserted low and the CMD* signal is negated high. Recall that only 32 bits are written to the primary write data buffer 124, which is 256 bits wide, so that only those portions written are marked as valid as indicated by the 32 byte valid bits.

At the time T70, a new cycle begins, and the SAMPADR and WRITE strobes are detected at a time T74, indicating another EISA write cycle. The comparator 164 asserts the PAHIT signal indicating that the EISA address is within the same primary address line currently residing in the primary address latch 152. The data from the EISA bus 42 is correspondingly written into the primary write data buffer 124 after a time T80, when the SAMPDAT strobe is provided to the EHMCTL 160. The write cycle completes one HCLK period later at a time T82. Note that the data stays in the primary write data buffer 124 so that the host bus 24 is not accessed, leaving it free for other operations. The cycle ends at a time T82, when the START* signal is asserted and the CMD* signal is negated indicating a new cycle.

The SAMPADR strobe is indicated at a time T86, two HCLK periods after the time T82, where the address is compared with the address in the primary address latch 152 by the comparator 164. In this case, the comparator 164 asserts the DDFHIT signal and negates the PAHIT signal indicating a PA miss, so that the data must be latched from the primary write data buffer 124 into the secondary write data buffer 125. Thus, at the time T86, the PL2SL* signal is asserted low to latch the data from the primary write data buffer 124 into the secondary write data buffer 125 and the PRIADLAT* signal is also asserted low latching the next EISA address into the primary address latch 152. The EBREQ* signal is asserted low at the time T86 to request the host bus 24, so that the data in the secondary write data latch 125 can be written into the memory array 32 through a read-merge-write cycle, as previously discussed. Eventually, the EHACK* signal is asserted low at a time T88 and the cycle on the host bus 24 begins one HCLK period later at a time T90, where the HADS* signal is asserted low and the HAOE signal is asserted high to place the address from the secondary address latch 154 onto the HA< > address signals. The HA< > address signals are valid between the time T90 and a time T96, and the data from the secondary write data buffer 125 is written into the memory array 32 at the address asserted on the HA< > address signals. The HRDY* and HBLAST* signals are asserted low between times T94 and T96 indicating the end of the cycle on the host bus 24. Meanwhile, the CMD* signal is asserted low at the time T88 and the SAMPDAT strobe is asserted at a time T92 where new data is latched into the primary write data buffer 124 from the EISA bus 42 through the transceiver 106.

A new write cycle begins at the time T94, and two HCLK periods later, at a time T98 the SAMPADR strobe is detected. The STRETCH signal is asserted low for 3 HCLK periods beginning at the time T98 until a time T104 since the secondary write data buffer 125 is not available. Since the DDFHIT signal is asserted and the PAHIT signal is negated indicating a PA miss, new data must be latched in. The SECADLAT* signal is asserted low at the time T98 and then high one HCLK period later at a time T100 to latch the address from the output of the primary address latch 152 into the secondary address latch 154. The remaining portion of the cycle is very similar to the previous cycle, where the PL2SL* signal is asserted at the time T102 and remains asserted until a time T104, so that the data is latched from the primary write data buffer 124 to the secondary write data buffer 125. Also, the PRIADLAT* signal is asserted low at the time T104 to a time T106 to latch the new EISA address into the primary address latch 152. The host bus cycle is initiated at a time T110 and completes at a time T116, and a new cycle on the EISA bus 42 begins at a time T112. Two HCLK periods after the time T112 at a time T116, the SAMPADR strobe is provided to the EHMCTL 160, and the PAHIT signal is asserted by the comparator 164. The SECADLAT* signal is asserted between times T118 and T120 so that the secondary address latch receives and latches the address from the output of the primary address latch 152. At a time T122, the SAMPDAT strobe is provided so that the data from the EISA bus 42 is written to the primary write data buffer 124, and the cycle completes and a new cycle begins at a time T124.

Two HCLK periods later at a time T128, the SAMPADR strobe is detected indicating a write cycle. The DDFHIT signal is negated indicating a DDF page miss, so the STRETCH*, the EBREQ*, the PRIADLAT*, the PL2SL* and the PSSEL signals are all asserted so that the new address is latched into the primary address latch 152, the data from the primary write data buffer 124 is latched into the secondary write buffer 125 and the host bus 24 is requested to perform a snoop cycle and then a write cycle. Eventually at a time T132, the EHACK* signal is asserted and a snoop cycle is initiated on the host bus 24 at a time T134, where the address in the primary address latch 152 is provided to the host bus 24. The SAMPLE DDF strobe occurs between a time T136 and a time T138, where the HLOCAL* signal is sampled asserted low by the EHMCTL 160 indicating that the new address is to the memory array 32. The host bus snoop cycle completes at a time T140 after the HRDY* and HBLAST* signals are asserted and negated. One HCLK period later at a time T142, a new cycle on the host bus 24 is initiated where the address from the secondary address latch 154 is asserted on the host bus 24 and where the data from the secondary write data buffer 125 is written to the memory array 32. Meanwhile, at the time T142, the SAMPDAT strobe is detected during the new data portion of the EISA bus 42 so that the data from the EISA bus 42 is latched through the transceiver 106 into the primary write data buffer 124.

At a time T146, a new cycle begins on the EISA bus 42 where at a time T150, two HCLK periods later, the SAMPADR strobe is detected by the EHMCTL 160. The PAHIT signal is asserted by the comparator 164 and since the new DDF page from the previous cycle is to the memory array 32, the data is eventually latched from the EISA bus 42 into the primary write data buffer 124 3 HCLK periods later at a time T156, after the SAMPDAT strobe is detected. The SECADLAT* signal is asserted low between a time T154 and the time T156, so that the primary address is latched into the secondary address latch 154. At a time T158, a new cycle begins which is anything other than non-CPU memory writes to the memory array 32, such as a refresh cycle or a read cycle. During this time, data is moved from the primary write data buffer 124 to the secondary write data buffer 125. A cycle on the host bus 24 is initiated to write the data from the secondary write data buffer 125 into the memory array 32. Note also that at a time T164, the PRIADLAT* signal is asserted to prepare the primary address latch 152 to latch the next EISA address.

Figure 10:
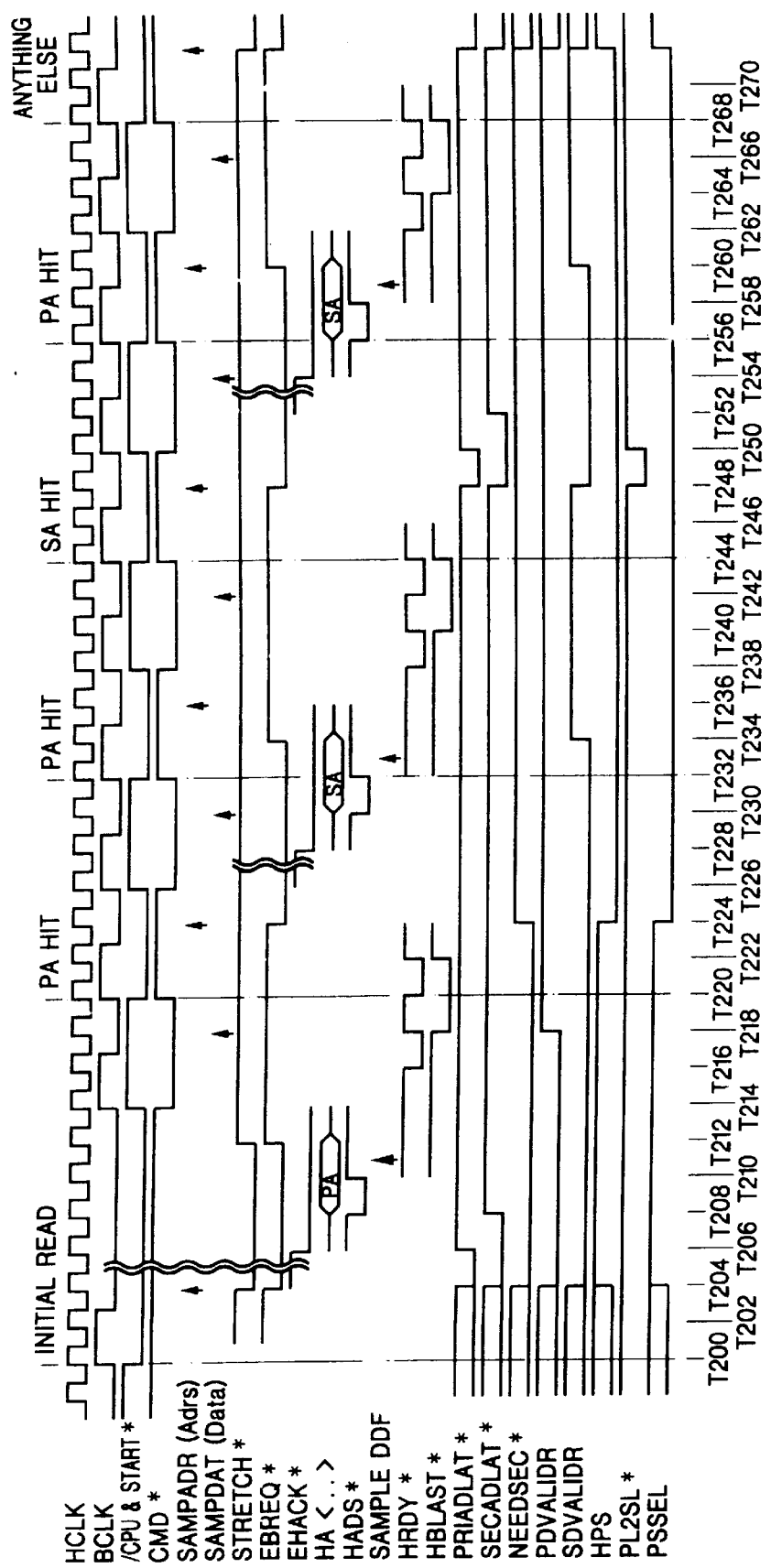
FIG. 10 is a timing diagram showing DMA memory read cycles to the main memory of FIG. 1, further illustrating double buffered operations according to the present invention.

Referring now to FIG. 10, a timing diagram is shown illustrating DMA memory read cycles to the memory array 32. An initial read cycle begins at a time T200 where the START* signal is asserted low. The SAMPADR strobe is detected at a time T204 as usual, which is two HCLK periods after the time T200. Since EISA mode is indicated as well as a read cycle at the time T204, the address on the EISA bus 42 must be provided to the host bus 24 for snooping and to determine if the cycle is to the memory array 32. Thus, the STRETCH*, EBREQ*, PRIADLAT*, SECADLAT* and the PSSEL signals are asserted to provide the EISA bus address to the multiplexer 180 for eventual assertion on the host bus 24. Also, the HPS signal is asserted high indicating that this cycle should fill the primary read data buffer 113 rather than the secondary read data buffer 112. It is noted that during read cycles the INCRE signal is also asserted high so that the primary address is incremented by the increment logic 156 before being provided by the secondary address latch 154. Since an initial read cycle is occurring, the NEEDSEC* flag is also set true at the time T204 since the secondary read data buffer 112 does not contain valid data. Although the NEEDSEC* flag is shown asserted earlier than that described in the flowchart diagram of FIG. 5, it is noted that either method will suffice as long as the NEEDSEC* flag is consistently used to fill the secondary write data buffer 112 when the PAHIT signal is asserted during a subsequent read cycle. The EHACK* signal is asserted low at a time T206, and the PRIADLAT* signal is also negated high as usual.

One HCLK period later at a time T208, a host bus cycle is initiated while the HAOE signal is also asserted, providing the primary address from the primary address latch 152 onto the host bus 24. Also, the SECADLAT* signal is negated at the time T208 to latch the incremented primary address into the secondary address latch 154. The SAMPLE DDF strobe occurs after a time T210, where it is determined that the read cycle is to the memory array 32, and the host snoop and primary fill cycle is completed at a time T212 where the STRETCH* and EBREQ* signals are negated. From the time T212 to a time T222, the data located at the address indicated by the PA address on the HA< > address signals is provided to the memory array 32, and this data is latched through the secondary read data buffer 112 to the primary read data buffer 113 as indicated by the HPS signal asserted high and to the EISA bus. At time T220 to T222 the second 128 bits of data is received from the memory array 32 into the primary read data buffer 113. Two cycles are needed as the memory bus is only 128 bits wide but the read buffers 112 and 113 are 256 bits wide. Additionally, it is noted that the CPUs may actually perform write back operations and the data be obtained during those operations instead of reading the memory array 32 in those cases. This is true of any of the memory read operations.

A new cycle begins on the EISA bus at a time T220, where the START signal is asserted and the CMD* signal is negated. Two HCLK periods later at a time T224, the SAMPADR strobe is detected and the PAHIT signal is asserted by the comparator 164. The NEEDSEC* flag is false, indicating that the secondary read data buffer 112 should be filled from the memory array 32. Since the PAHIT signal indicates the data is located in the primary read data buffer 113, the SDB 44 provides the data to the EISA bus 42. At the time T224, the NEEDSEC* flag is false and the EBREQ* signal is asserted low to request a cycle on the host bus 24 to fill the secondary read data buffer 112. Eventually, at a time T228, the EHACK* signal is asserted low and the read cycle begins on the host bus 24 one HCLK period later at a time T230, where the address from the secondary address latch 154 is asserted on the HA< > signals between the time T230 and a time T234. The secondary read data buffer 112 is indicated by the HPS signal negated low and the PSSEL signal also negated low. The secondary address on the HA< > signals is provided to the memory array 32, which provides data from the memory array 32 to the SDB 44 and into the secondary read data buffer 112. The read cycle to the memory array 32 completes at a time T244. The EISA read cycle will have previously completed at time T232, with the data being sourced directly from the primary read data buffer 113. The memory read operation effectively prefetches the next line, allowing faster operations if sequential operations are being performed.

Meanwhile, at a time T232 which is one HCLK period after the time T230, a new cycle begins on the EISA bus 42 where the START* signal is asserted low. The SAMPADR strobe is detected asserted after one HCLK period at a time T236, at which time the comparator 164 again asserts the PAHIT signal. Since the PAHIT signal is asserted, the data is provided from the primary read data buffer 113 through the transceiver 106 onto the EISA bus 42, and no further operation is necessary. It is significant here to note that due to the double buffering operations according to the present invention, a new cycle on the host bus 24 is not necessary since the data is already available.

At the time T244, a new cycle begins on the EISA bus 42 and the EISA address is detected at a time T248 when the SAMPADR strobe is detected. The comparator 166 asserts the SAHIT signal indicating that the data is located in the secondary read data buffer 112. The data must be moved into the primary read data buffer 113 and a new data line should be loaded into the secondary write data buffer 112. Thus, the EBREQ* signal is asserted low to request the host bus 24, and the PL2SL* signal is asserted to transfer the contents of the secondary read data buffer 112 to the primary read data buffer 113. Further, the PRIADLAT*, the INCRE and the SECADLAT* signal are all asserted to capture the new EISA address into the primary address latch 152, and to provide an incremented primary address from the increment logic 156 to the secondary address latch 154, so that the secondary read data buffer 112 can be filled with the next line of data from the memory array 32, to further continue the prefetching.

Eventually at a time T254, the EHACK* signal goes low, and the cycle on the host bus 24 begins at a time T256 where the address from the secondary address latch 154 is asserted on the host bus 24 and provided to the memory array 32. The memory array 32 provides the next line of data to the SDB 44, which is eventually provided to the secondary read data buffer 112. The cycle on the host bus 24 completes at a time T268. Meanwhile, at a time T256, a new cycle on the EISA bus 42 is initiated where the PAHIT signal is asserted two HCLK periods later at a time T260. Notice that the data resides in the primary read data buffer 113 and can be provided directly to the EISA bus 42 without further need to access the host bus 24.

Figure 11:
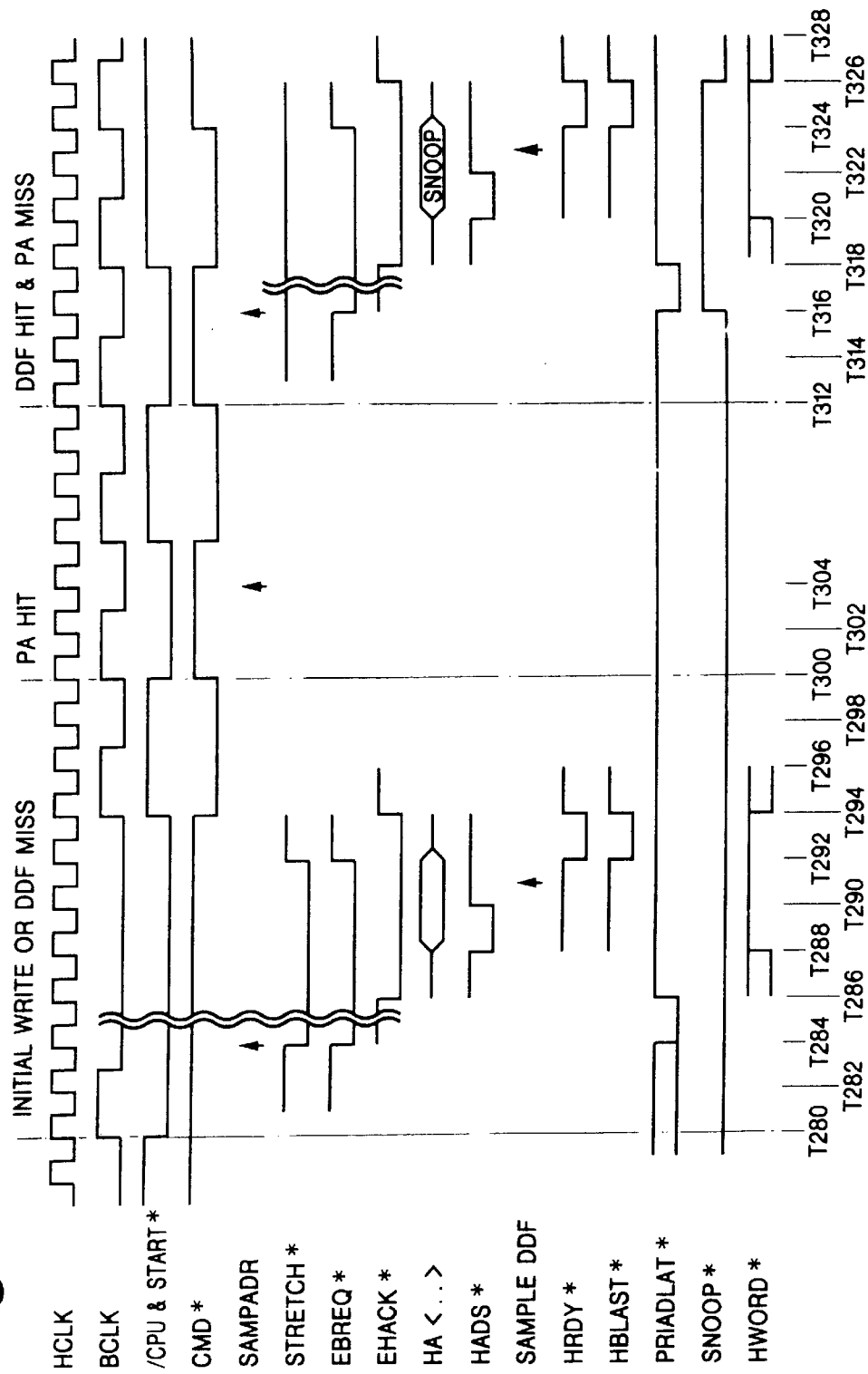
FIG. 11 is a timing diagram illustrating a DMA memory write cycle to non-host memory.

Referring now to FIG. 11, a timing diagram is shown illustrating a DMA write cycle to a memory device other than the memory array 32, particularly one located on the EISA bus 42. A cycle begins at a time T280 on the EISA bus 42, where the SAMPADR strobe is detected two HCLK periods later at a time T284. The cycle may either an initial write or a cycle indicating a DDF page miss. A host snoop cycle is necessary to determine if the write is to the memory array 32, so that the EBREQ* signal is asserted low at the time T284. The PRIADLAT* signal is toggled low then high between the time T284 and a time T286, so that the EISA address is latched into the primary address latch 152. Eventually, the EHACK* signal is asserted low at the time T286, and the host snoop cycle begins at a time T288 with the assertion of the HADS* signal, where the EISA address is asserted on the host bus 24. After a time T290, the SAMPLE DDF occurs and the HLOCAL* signal indicates that the EISA write cycle is not to the memory array 32. Since the memory write is not to the memory array 32, no further action is taken and the host bus 24 is released subsequently at a time T294.

It is significant to note that even though the write is not to the memory array 32, the EISA address is saved in the primary address latch 152 for comparison with a subsequent EISA address. The next cycle begins at a time T300 on the EISA bus 42 where a PAHIT is indicated at a time T304 by the comparator 164. Since the write occurs to the same line as the primary address, and the primary address is not to the memory array 32, no further action need be taken. Since a snoop cycle updates an entire line and the new address is to the same line, a snoop cycle on the host bus 24 is not necessary. The following cycle begins at a time T312 where a DDFHIT occurs at the time T316, although a PA miss is also indicated. Thus, although the write is not to the memory array 32, a snoop must be performed on the host bus 24 to satisfy cache invalidate protocol. A snoop cycle is subsequently performed on the host bus 24 beginning at a time T320, and which completes at a time T326.

Figure 12:
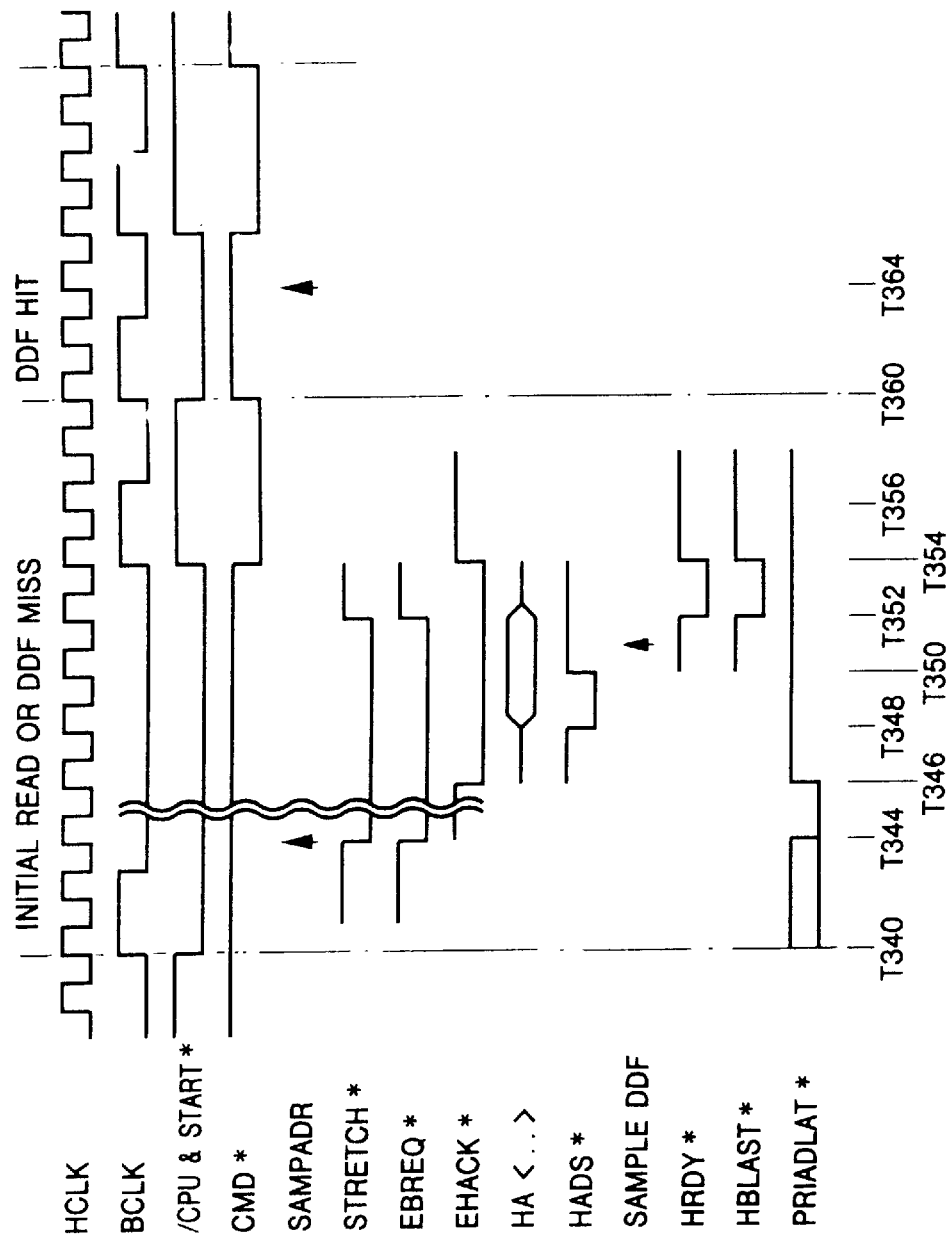
FIG. 12 is a timing diagram illustrating a DMA memory read cycle to non-host memory.

Referring now to FIG. 12, a timing diagram is shown illustrating a DMA memory read cycle to non-host memory. A new cycle begins on the EISA bus 42 at a time T340 and the SAMPADR strobe is provided at a time T344, indicating an initial write cycle. The STRETCH* signal is asserted at the time T344 and the EBREQ* signal is also asserted to request the host bus 24. Note that the EISA address is latched into the primary address latch 152 with the assertion and negation of the PRIADLAT* signal between the time T344 and a time T346. Thus, the EISA address is saved for comparison. The EHACK* signal is asserted low at the time T346 and the cycle begins on the host bus 24 at a time T348. The SAMPLE DDF strobe occurs after a time T350, where it is determined that the cycle is to EISA memory and not to the memory array 32. The host bus 24 is thus released at a time T354. A new cycle begins at a time T360 where the SAMPADR strobe occurs at a time T364 and the comparator 164 asserts the DDFHIT signal. Since a DDFHIT is indicated, the read cycle is still to the EISA memory and not the memory array 32, so that no further action is taken.

Figure 13:
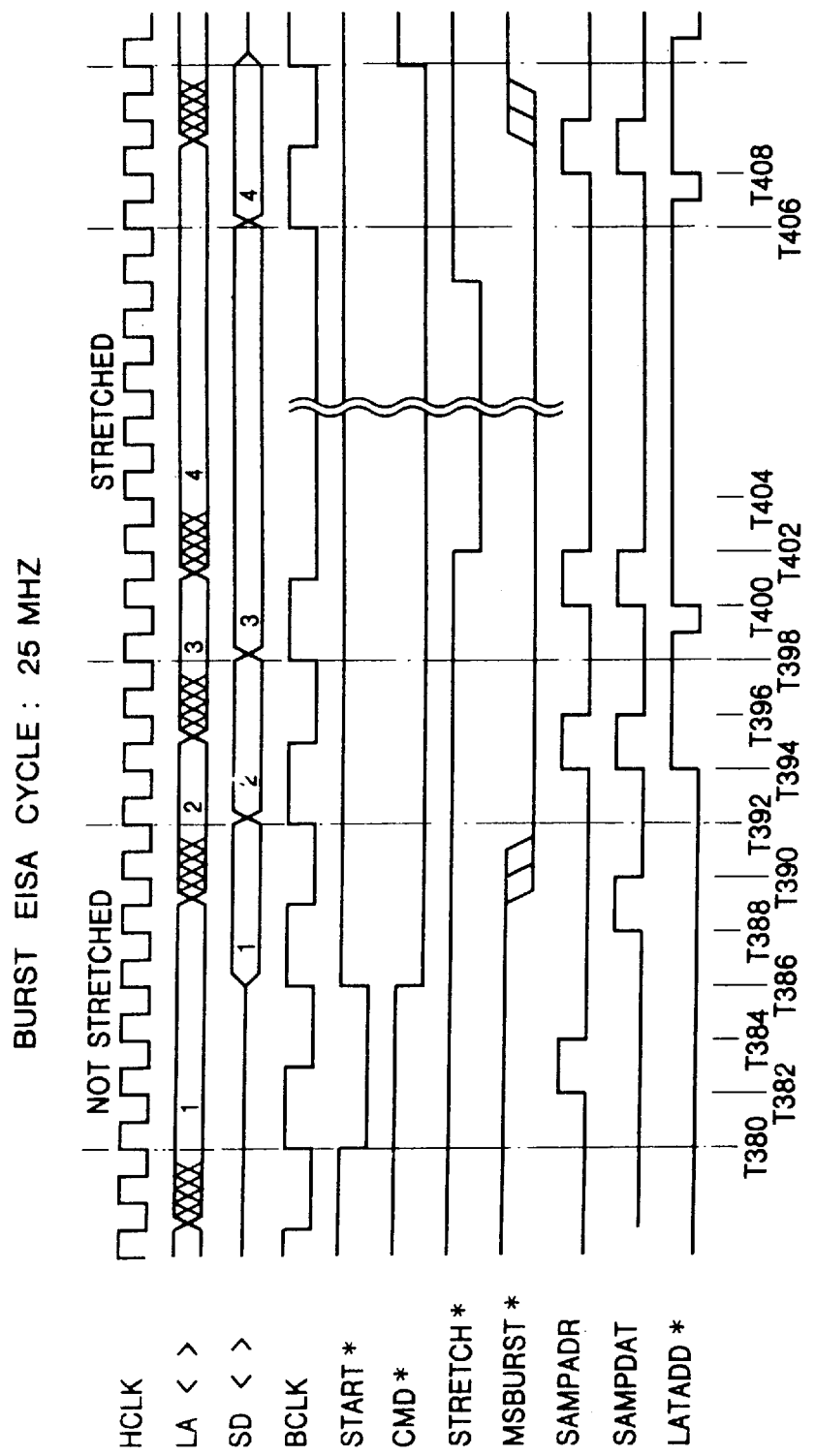
FIG. 13 is a timing diagram illustrating a burst EISA cycle.

Referring now to FIG. 13, a timing diagram is shown illustrating a normal burst EISA cycle at 25 MHz. It was previously noted that the master latch 172 remained open and transparent during non-burst cycles since the address on the EISA bus 42 is held with the STRETCH* signal. During burst cycles, however, the master latch 172 is used to latch data with the LATADD* signal asserted by the EBTCTL 158, thereby allowing the EISA address to be provided to the primary address latch 152 and the secondary address latch 152 as well as all the comparators 164, 166 and 170. The cycle begins at a time T380 where the START* signal is asserted low. The CMD* signal is asserted low at a time T386, and the MSBURST* signal is asserted three HCLK periods later at a time T392 indicating a burst cycle. Subsequently at a time T394, the LATADD* signal is negated high to anticipate a stretched burst cycle. At a time T398, a third data set is asserted on the SD< > data signals of the EISA bus 42 and the LATADD* signal is asserted low one-half HCLK period later and then is asserted high at a time T400. Subsequently, at a time T402, the STRETCH* signal is asserted low at the time T402 indicating a stretched burst EISA cycle. Since the LATADD* signal latched the EISA address signals into the master latch 172, the initial EISA address remains valid to the primary address latch 152 and the secondary address latch 154, while the EISA address signals become invalid at the time T402 and are asserted with a new address at approximately a time T404. At a later time T406, new data appears on the SD< > data signals and that the LATADD* signal is strobed between the time T406 and a time T408, which is one HCLK period after the time T406, so that the new EISA address on the LA< > signals is latched through the master address latch 172.

Figure 14A:
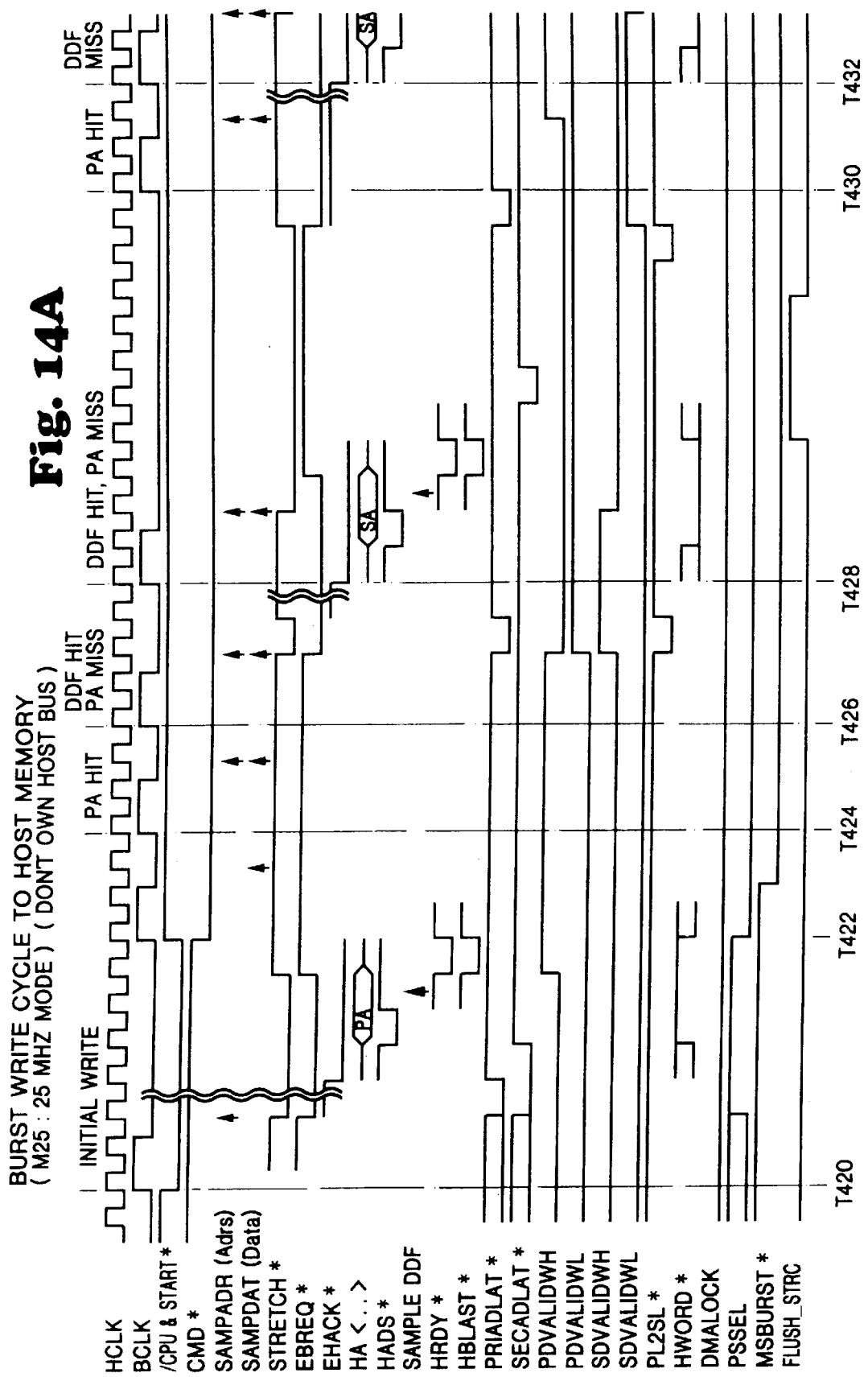
FIGS. 14A,14B are a timing diagram illustrating a burst write cycle to the main memory of FIG. 1 using double buffered operations according to the present invention.
Figure 14B:
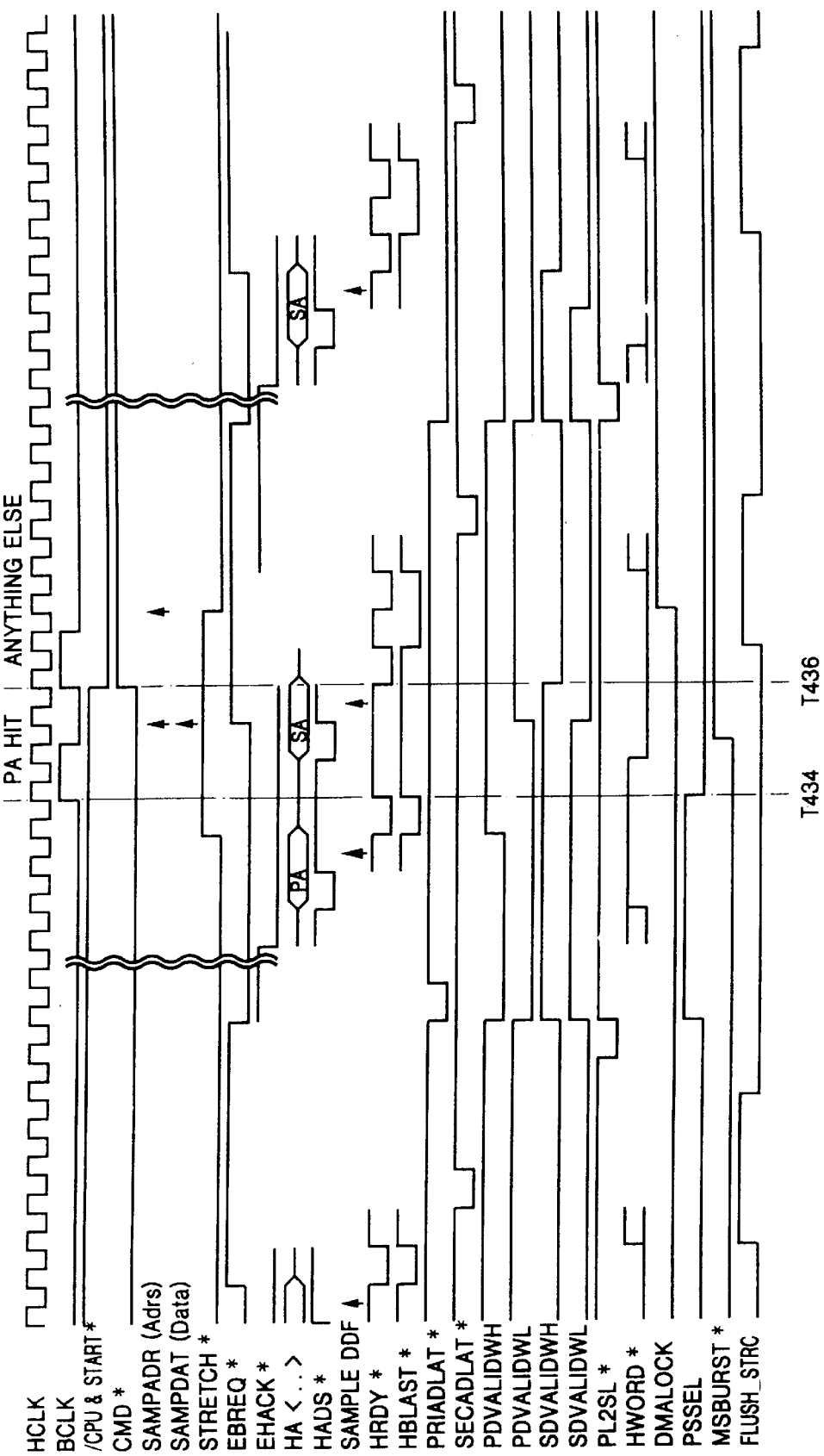

Referring now to FIG. 14A and 14B, a timing diagram is shown illustrating a burst write cycle to memory array 32 in the 25 MHz mode. The burst write cycle to the memory array 32 occurs in a very similar manner as the DMA memory write cycles to the memory array 32 shown in FIG. 9, so that the sequence of events are almost identical. A first cycle begins at a time T420 which corresponds to the time T50 in FIG. 9. The cycle is very similar up to a time T422, when the CMD* signal is asserted low corresponding to the time T64 in FIG. 9. From then on, times T424, T426, T428, T430, T432, T434 and T436 as indicated in FIG. 14 correspond to the times T70, T82, T94, T112, T124, T146 and T158, respectively, shown in FIG. 9. Although the burst cycle executes a little faster than the regular DMA cycles shown in FIG. 9, the two cycle types are very much the same for purposes of this disclosure. As discussed previously for FIG. 13, the LATADD* signal is strobed to latch in the EISA address through the master latch 172 during the burst cycle when stretch cycles occur.

Figure 15:
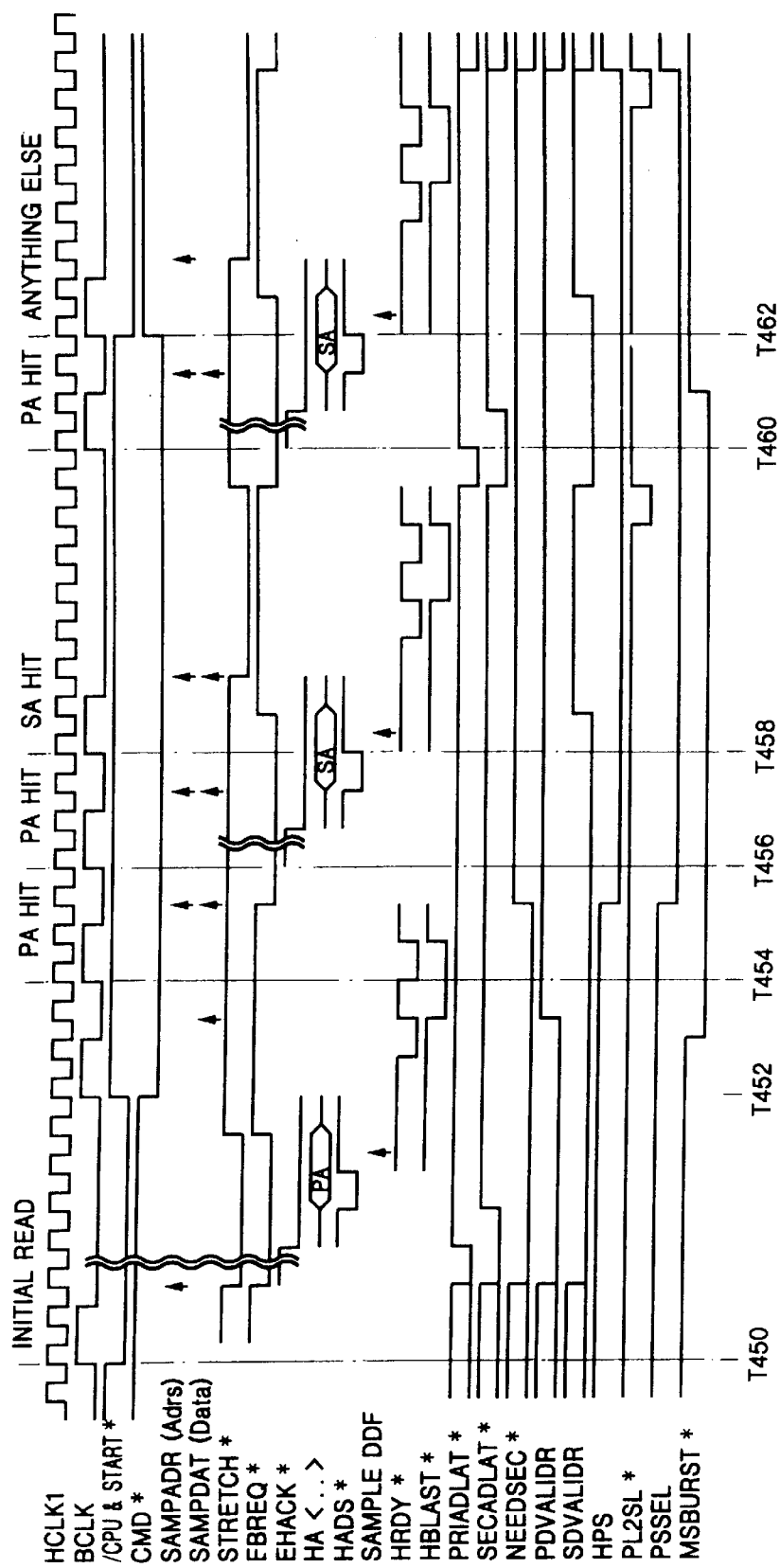
FIG. 15 is a timing diagram illustrating a burst read cycle to the main memory of FIG. 1 using double buffered operations according to the present invention.

Referring now to FIG. 15, a timing diagram is shown illustrating a burst read cycle to host memory in the 25 MHz mode. The burst read cycle to host memory show in FIG. 15 is very similar to the DMA read cycle to host memory shown in FIG. 10. At a time T450 to a time T452 at the assertion of the CMD* signal, the burst cycle is almost identical to the DMA cycle. From then on, times T454, T456, T458, T460 and T462 as indicated in FIG. 15 are analogous to the times T220, T232, T244, T256 and T268, respectively, as shown in FIG. 10.

Figure 16A:
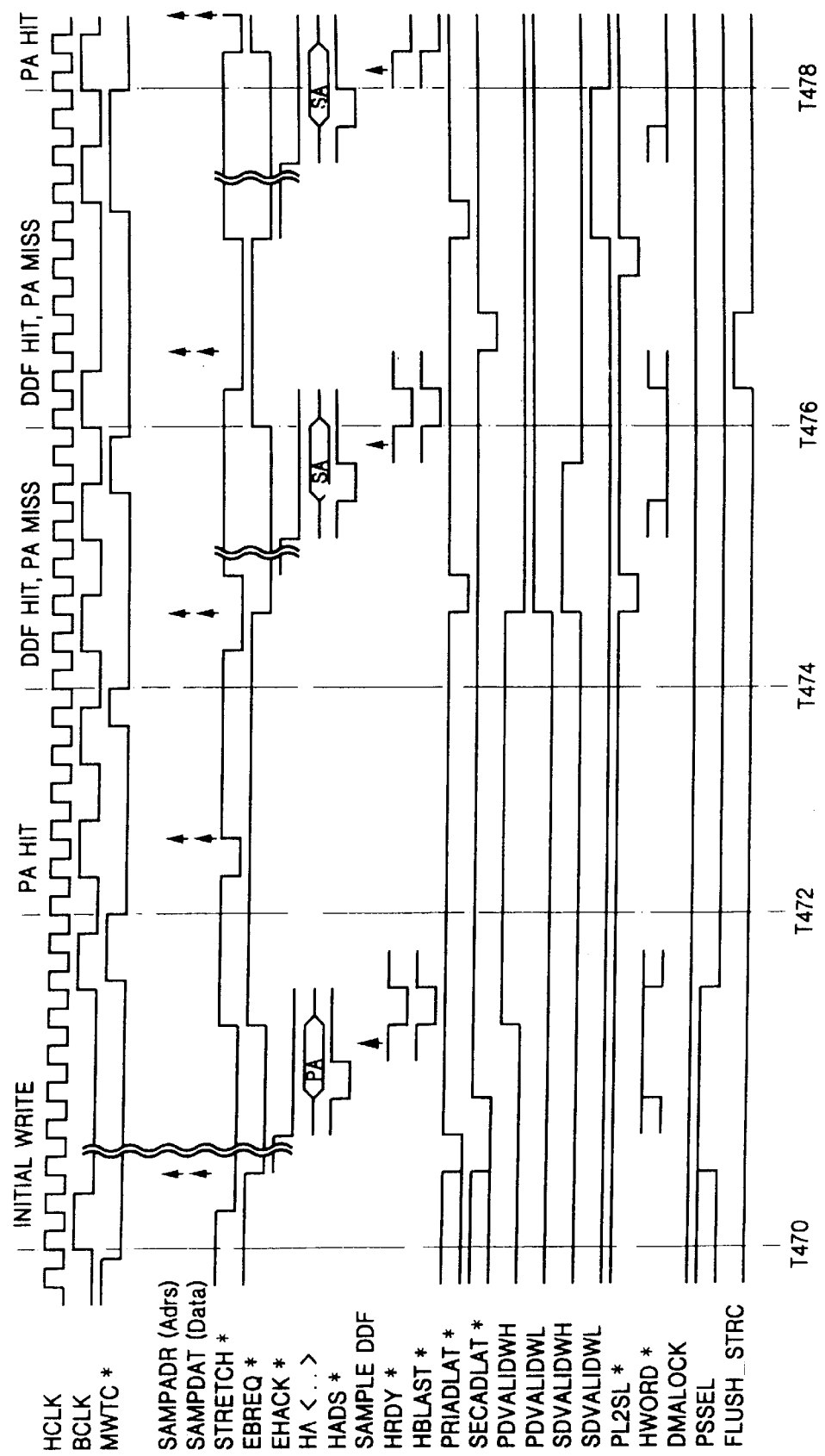
FIGS. 16A and 16B are a timing diagram illustrating ISA write cycles to the main memory of FIG. 1 using double buffered operations according to the present invention.
Figure 16B:
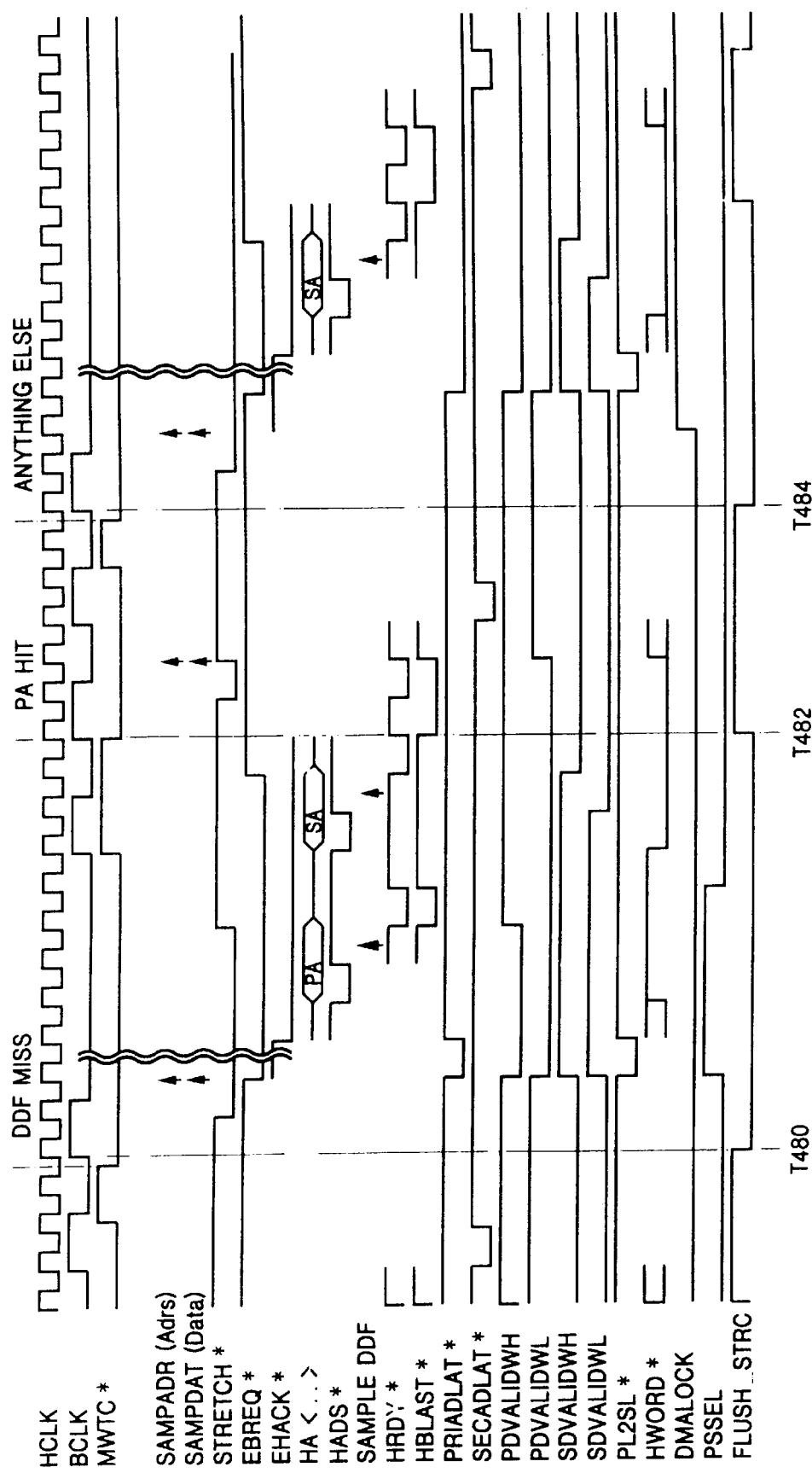

Referring now to FIGS. 16A and 16B, a timing diagram is shown illustrating an ISA write cycle to the memory array 32 in a 25 MHz mode. Again, for all practical purposes, the ISA write cycle to the memory array 32 shown in FIG. 16 is almost identical to the DMA memory write cycle to the memory array 32 shown in FIG. 9, except that the MWTC* signal is used for timing purposes rather than the START* and CMD* signals as is known. Also, the STRETCH* signal and the EBREQ* signals are slightly different. The remaining portions of the two cycle types are very similar. Times T470, T472, T474, T476, T478, T480, T482 and T484 are indicated in FIG. 16, which are analogous to the times T50, T70, T82, T94, T112, T124, T146 and T158, respectfully, shown in FIGS. 9A and 9B.

Figure 17:
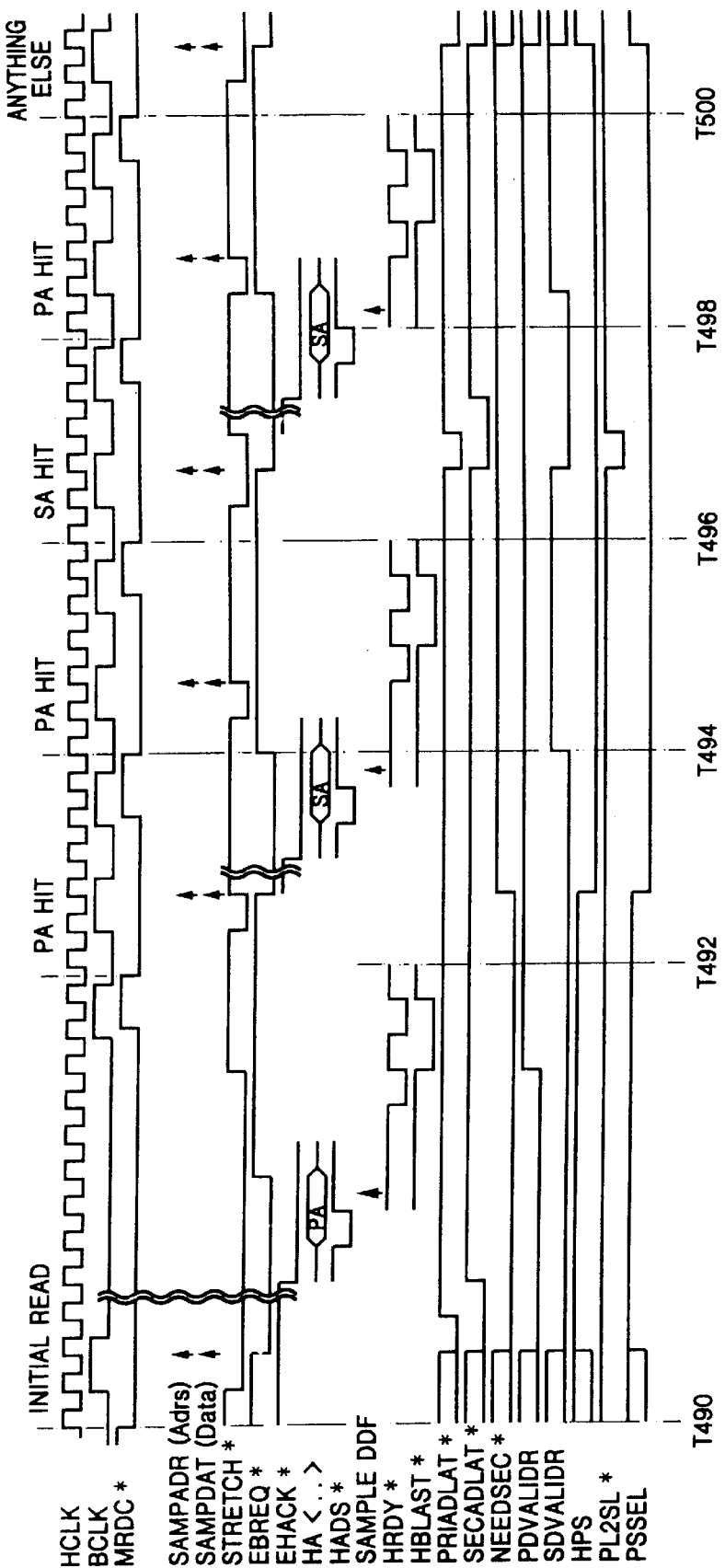
FIG. 17 is a timing diagram illustrating ISA read cycles to the main memory of FIG. 1 using double buffered operations according to the present invention.

Referring now to FIG. 17 a timing diagram is shown illustrating an ISA read cycles to the memory array 32 in a 25 MHz mode. Again, the ISA read cycles shown in FIG. 17 are very analogous to the DMA read cycles shown in FIG. 10, where times T490, T492, T494, T496, T498 and T500 shown in FIG. 17 are analogous to the times T200, T220, T232, T244, T256 and T268, respectfully, shown in FIG. 10. The MRDC* signal is used rather than the START* and CMD* signals, and the STRETCH* and EBREQ* signals are somewhat different. The remaining signals shown of the timing diagram of FIG. 17 are very similar as those shown in FIG. 10.

It can now be appreciated that the double buffering apparatus and operations according to the present invention reduces the hold times on the host bus of a computer system. A primary write buffer and a secondary write buffer implement a double write buffer, where the primary buffer is filled with data from several write cycles to the same line in memory from a device on the expansion bus before the actual write takes place. When a write occurs to a different line, the data in the primary buffer is shifted to the secondary write buffer and then written to main memory. The new data is written to the primary write buffer to start a new line. Writes within the same page need not be snooped for DDF hits, and writes to the same line need not be snooped to satisfy cache invalidate protocol. For read cycles from main memory to the expansion bus, a full line from memory is retrieved into a primary read data buffer for access by the EISA bus. If a subsequent read occurs to the same line, the next line from main memory is retrieved into a secondary read data buffer to anticipate hits next to the first line. If another subsequent hit occurs to the secondary read data buffer, the data is shifted to the primary read data buffer and a new line is retrieved into the secondary read data buffer. A memory controller includes a primary and a secondary address latch to compare the new expansion bus address with previous addresses. The memory controller includes the logic to control the address latches and data buffers, and to control cycles to the host bus and main memory.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. In a computer system having a host bus having address, data and control signals, a CPU connected to said host bus, a main memory array, a memory controller coupled to said memory array, an expansion bus, a bus master connected to said expansion bus, and a data transfer unit having a plurality of latches connected between said expansion bus, said host bus and said main memory array, a method for transferring data from the expansion bus to the main memory array, the method comprising the steps of:

determining whether the operation is a read operation or a write operation;

when the operation is a write operation, performing the steps of:
    receiving data from said expansion bus at a first write latch of the plurality of latches;
    receiving data from said first write latch at a second write latch of the plurality of latches; and
    providing data from the second write latch to said main memory array, and when the operation is a read operation, performing the steps of:
    receiving data from said main memory array at a first read latch of the plurality of latches;
    receiving data from said first read latch at a second read latch of the plurality of latches; and
    providing data to said expansion bus.

2. The method of claim 1, further comprising the steps of:

when the operation is a write operation, performing the steps of:
    storing the address of data contained in the first write latch in a first write address latch; and
    storing the address of data contained in the second write latch in a second write address latch; and when the operation is a read operation, performing the steps of:
    storing the address of data contained in the first read latch in a first read address latch; and
    storing the address of data contained in the second read latch in a second read address latch.

3. The method of claim 2, further comprising the steps of:

when the operation is a write operation, performing the steps of:
    loading said first write address latch and said first write latch with the address and data on a first write operation;
    comparing the address of a subsequent write operation to said loaded first write address to determine if the address is to a location contained within said first write latch;
    transferring said first write latch data to said second write latch and said first write address to said second write address latch;
    transferring said second write latch data to said main memory array;
    loading said first write latch and said first write address latch with the data and address of said subsequent write operation if said subsequent write operation is to a location not contained within said first write latch; and
    storing said subsequent write operation data in said first write latch if said subsequent write operation is to a location contained within said first write latch.

4. The method of claim 2, further comprising the steps of:

when the operation is a read operation, performing the steps of:
    loading said second read address latch with the address on a first read operation;
    transferring data from said main memory array to said second read latch; and
    providing data from said second read latch to said expansion bus after transfer from said main memory array.

5. The method of claim 4, further comprising the steps of:

when the operation is a read operation, performing the steps of:
    comparing a subsequent read operation to determine if the address is to a location having data contained in said second read latch;
    providing said subsequent data to said expansion bus from said second read latch;
    obtaining the data at the next sequential address from said main memory array; and
    storing said next sequential data in said first read latch and said next sequential address in said first read address latch if said subsequent read operation is to a location having data contained in said second read latch.

6. The method of claim 4, further comprising the steps of:

when the operation is a read operation, performing the steps of:
    comparing a subsequent read operation after filling said first read latch and said first read address latch to determine if the address is to a location having data in said second read latch; and
    providing data to said expansion bus from said second read latch if said subsequent read operation is to a location having data contained in said second read latch.

7. The method of claim 4, further comprising the steps of:

when the operation is a read operation, performing the steps of:
    comparing a subsequent read operation after filling said first read latch and said first read address latch to determine if the address is to a location having data in said first read latch;
    transferring data from said first read latch to said second read latch;
    transferring the address value from said first read address latch to said second read address latch;
    providing said data from said second read latch to said expansion bus; and
    obtaining the data at the next sequential address from said main memory array and storing said next sequential address in said first read address latch if said subsequent read operation is to a location having data contained in said first read latch.

8. In a computer system having an expansion bus, a bus master connected to said expansion bus, a host bus, a CPU connected to said host bus, a main memory array, a memory controller coupled to said memory array, and a data transfer unit positioned between said expansion bus, said host bus and said main memory array, said data transfer unit having a plurality of latches connected between said main memory array and said expansion bus, a method comprising the steps of:

when an operation is a write operation, performing the steps of:
    receiving data from said expansion bus at a first write latch of the plurality of latches;
    receiving data from said first write latch at a second write latch of the plurality of latches;
    providing data to said main memory array; and
    controlling transfer of data from said expansion bus to said first write latch to said second write latch to said main memory array; and when the operation is a read operation, performing the steps of:
    receiving data from said main memory array at a first read latch of the plurality of latches;

receiving data from said first read latch at a second read latch of the plurality of latches;

providing data to said expansion bus; and controlling transfer of data from said main memory array to said first read latch to said second read latch to said expansion bus; and receiving a graphics display command from said CPU.

9. The method of claim 8, further comprising the steps of:

when the operation is a write operation, performing the steps of:

storing the address of data contained in the first write address latch of the plurality of latches;

storing the address of data contained in the second write latch in a second write address latch of the plurality of latches; and when the operation is a read operation, performing the steps of:

storing the address of data contained in the first read latch in a first read address latch of the plurality of latches; and storing the address of data contained in the second read latch in a second read address latch of the plurality of latches.

10. The method of claim 9, further comprising the steps of:

when the operation is a write operation, performing the steps of:

loading said first write address latch and said first write latch with the address and data on a first write operation;

comparing the address of a subsequent write operation to said loaded first write address to determine if the address is to a location contained within said first write latch;

transferring said first write latch data to said second write latch and said first write address value to said second write address latch;

transferring said second write latch data to said main memory array;

loading said first write latch and said first write address latch with the data and address of said subsequent write operation if said subsequent write operation is to a location not contained within said first write latch; and storing said subsequent write operation data in said first write latch if said subsequent write operation is to a location contained within said first write latch.

11. The method of claim 9, further comprising the steps of:

when the operation is a read operation, performing the steps of:

loading said second read address latch with the address on a first read operation;

transferring data from said main memory array to said second read latch; and providing data from said second read latch to said expansion bus after transfer from said main memory array.

12. The method of claim 11, further comprising the steps of:

when the operation is a read operation, performing the steps of:

comparing a subsequent read operation to determine if the address is to a location having data contained in said second read latch; and providing said subsequent data to said expansion bus from said second read latch;

obtaining the data at the next sequential address from said main memory array; and storing said next sequential data in said first read latch and said next sequential address in said first read address latch if said subsequent read operation is to a location having data contained in said second read latch.

13. The method of claim 12, further comprising the steps of:

when the operation is a read operation, performing the steps of:

comparing a subsequent read operation after filling said first read latch and said first read address latch to determine if the address is to a location having data in said second read latch; and providing data to said expansion bus from said second read latch if said subsequent read operation is to a location having data contained in said second read latch.

14. The method of claim 12, further comprising the steps of:

when the operation is a read operation, performing the steps of:

comparing a subsequent read operation after filling said first read latch and said first read address latch to determine if the address is to a location having data in said first read latch;

transferring data from said first read latch to said second read latch;

transferring the address value from said first read address latch to said second read address latch;

providing said data from said second read latch to said expansion bus; and obtaining the data at the next sequential address from said main memory array and storing said next sequential address in said first read address latch if said subsequent read operation is to a location having data contained in said first read latch.

15. In a computer system having an expansion bus, a bus master connected to said expansion bus, a host bus having address, data and control signals, a CPU connected to said host bus, a main memory array, a memory controller coupled to said memory array, and a data transfer unit positioned between said expansion bus, said host bus and said main memory array, said data transfer unit having a plurality of latches connected between said main memory array and said expansion bus, a method comprising the steps of:

when an operation is a write operation, performing the steps of:

receiving data from said expansion bus at a first write latch;

receiving data from said first write latch at a second write latch;

providing data to said main memory array; and controlling transfer of data from said expansion bus to said first write latch to said second write latch to said main memory array; and when the operation is a read operation, performing the steps of:

receiving data from said main memory array a first read latch;

receiving data from said first read latch at a second read latch;

providing data to said expansion bus; and controlling transfer of data from said main memory array to said first read latch to said second read latch to said expansion bus; and transferring instructions from a user via an input/output device coupled to said expansion bus to said CPU.

16. The method of claim 15, further comprising the steps of:
when the operation is a write operation, performing the steps of:
storing the address of data contained in the first write latch at a first write address latch;
storing the address of data contained in the second write latch at a second write address latch;
storing the address of data contained in the first read latch at a first read address latch; and
storing the address of data contained in the second read latch at a second read address latch.

17. The method of claim 16, further comprising the steps of:
when the operation is a write operation, performing the steps of:
loading said first write address latch and said first write latch with the address and data on a first write operation;
comparing the address of a subsequent write operation to said loaded first write address to determine if the address is to a location contained within said first write latch;
transferring said first write latch data to said second write latch and said first write address to said second write address latch;
transferring said second write latch data to said main memory array and loading said first write latch and said first write address latch with the data and address of said subsequent write operation if said subsequent write operation is to a location not contained within said first write latch; and
storing said subsequent write operation data in said first write latch if said subsequent write operation is to a location contained within said first write latch.

18. The method of claim 16, further comprising the steps of when the operation is a read operation, performing the steps of:
loading said second read address latch with the address on a first read operation;
transferring data from said main memory array to said second read latch; and
providing data from said second read latch to said expansion bus after transfer from said main memory array.

19. The method of claim 18, further comprising the steps of:
when the operation is a read operation, performing the steps of:
comparing a subsequent read operation to determine if the address is to a location having data contained in said second read latch;
providing said subsequent data to said expansion bus from said second read latch;
obtaining the data at the next sequential address from said main memory array; and
storing said next sequential data in said first read latch and said next sequential address in said first read address latch if said subsequent read operation is to a location having data contained in said second read latch.

20. The method of claim 19, further comprising the steps of:
when the operation is a read operation, performing the steps of:
comparing a subsequent read operation after filling said first read latch and said first read address latch to determine if the address is to a location having data in said second read latch; and
providing data to said expansion bus from said second read latch if said subsequent read operation is to a location having data contained in said second read latch.

21. The method of claim 19, further comprising the steps of:
when the operation is a read operation, performing the steps of:
comparing a subsequent read operation after filling said first read latch and said first read address latch to determine if the address is to a location having data in said first read latch;
transferring data from said first read latch to said second read latch,
transferring the address value from said first read address latch to said second read address latch,
providing said data from said second read latch to said expansion bus,
obtaining the data at the next sequential address from said main memory array; and
storing said next sequential address in said first read address latch if said subsequent read operation is to a location having data contained in said first read latch.

22. In a computer system having a host bus having address, data and control signals, a CPU connected to said host bus, a main memory array, a memory controller coupled to said memory array, an expansion bus, a bus master connected to said expansion bus, and a data transfer unit having a plurality of latches connected between said expansion bus, said host bus and said main memory array, a circuit for transferring data from the expansion bus to the main memory array, the circuit comprising:
a first write latch of the plurality of latches coupled to receive data from said expansion bus when an operation is a write operation;
a second write latch of the plurality of latches coupled to receive data from said first write latch, said second write latch coupled to provide data to said main memory array, when the operation is a write operation;
a first read latch of the plurality of latches coupled to receive data from said main memory array when the operation is a read operation; and
a second read latch of the plurality of latches coupled to receive data from said first read latch when the operation is a read operation, said second read latch further coupled to provide data to said expansion bus when the operation is a read operation.

23. The circuit of claim 22, further comprising:
a first write buffer coupled to store the address of data contained in the first write latch in a first write address latch when the operation is a write operation; and
a second write buffer coupled to store the address of data contained in the second write latch in a second write address latch when the operation is a write operation; and
a first read buffer coupled to store the address of data contained in the first read latch in a first read address latch when the operation is a read operation; and
a second read buffer coupled to store the address of data contained in the second read latch in a second read address latch when the operation is a read operation.

24. The circuit of claim 23, further comprising:
a latch select circuit coupled to indicate whether a subsequent write operation is to said loaded first write address contained within said first write latch when the operation is a write operation; wherein
  said first write buffer and said first write latch are coupled to store the address and data on a first write operation when the operation is a write operation;
  said first write latch data coupled to transfer said data to said second write latch and further coupled to transfer said first write address to said second write buffer, when the operation is a write operation;
  said second write latch data is coupled to transfer data to said main memory array when the operation is a write operation;
  said first write latch and said first write address latch are coupled to receive the data and address of said subsequent write operation if said subsequent write operation is to a location not contained within said first write latch when the operation is a write operation; and
  said first write latch is coupled to store said subsequent write operation data if said subsequent write operation is to a location contained within said first write latch when the operation is a write operation.

25. The circuit of claim 23, further wherein:
said second read buffer is coupled to store the address on a first read operation when the operation is a read operation;
said second read latch is coupled to receive data from said main memory array when the operation is a read operation; and
said second read latch is coupled to provide data to said expansion bus after transfer from said main memory array when the operation is a read operation.

26. The circuit of claim 25, further comprising:
a latch select circuit coupled to indicate whether a subsequent read operation is from an address location having data contained in said second read latch when the operation is a read operation; and wherein
  said second read latch is coupled to provide said subsequent data to said expansion bus when the operation is a read operation;
  said main memory array is coupled to provide data at the next sequential address when the operation is a read operation; and
  said first read latch coupled to store said next sequential data, and said first read address latch coupled to store said next sequential address if said subsequent read operation is to a location having data contained in said second read latch when the operation is a read operation.

27. The circuit of claim 26, further comprising:
a latch select circuit coupled to indicate whether a subsequent read operation is from an address location having data contained in said second read latch, after filling said first read latch and said first read address latch when the operation is a read operation; and wherein
said second read latch coupled to provide data to said expansion bus from said second read latch if said subsequent read operation is to a location having data contained in said second read latch when the operation is a read operation.

28. The circuit of claim 26, further comprising:
a latch select circuit coupled to indicate whether a subsequent read operation is from an address location having data contained in said second read latch, after filling said first read latch and said first read address latch when the operation is a read operation; and wherein
said first read latch is coupled to transfer data to said second read latch when the operation is a read operation;
said first read address latch is coupled to transfer the address value to said second read address latch when the operation is a read operation;
said second read latch coupled to provide said data to said expansion bus when the operation is a read operation; and
said main memory array is coupled to provide data at the next sequential address and said first read address latch is coupled to store said next sequential address if said subsequent read operation is to a location having data contained in said first read latch when the operation is a read operation.

29. In a computer system having an expansion bus, a bus master connected to said expansion bus a host bus, a CPU connected to said host bus, a main memory array, a memory controller coupled to said memory array, and a data transfer unit positioned between said expansion bus, said host bus and said main memory array, said data transfer unit having a plurality of latches connected between said main memory array and said expansion bus, a circuit comprising:
  a first write latch coupled to receive data from said expansion bus of the plurality of latches when an operation is a write operation;
  a second write latch of the plurality of latches coupled to receive data from said first write latch when the operation is a write operation, said second write latch coupled to provide data to said main memory array when the operation is a write operation, and
  a data transfer controller for controlling transfer of data from said expansion bus to said first write latch to said second write latch to said main memory array when the operation is a write operation;
  a first read latch of the plurality of latches coupled to receive data from said main memory array when the operation is a read operation;
  a second read latch of the plurality of latches coupled to receive data from said first read latch when the operation is a read operation, said second read latch coupled to provide data to said expansion bus when the operation is a read operation;
  a data transfer controller for controlling transfer of data from said main memory array to said first read latch to said second read latch to said expansion bus when the operation is a read operation; and
  a graphics display receiver for receiving a graphics display command from said CPU.

30. The circuit of claim 29, further comprising:
a first write buffer coupled to store the address of data contained in the first write latch in a first write address latch of the plurality of latches when the operation is a write operation;
a second write buffer coupled to store the address of data contained in the second write latch in a second write address latch of the plurality of latches when the operation is a write operation;
a first read buffer coupled to store the address of data contained in the first read latch in a first read address latch of the plurality of latches when the operation is a read operation; and a second read buffer coupled to store the address of data contained in the second read latch in a second read address latch of the plurality of latches when the operation is a read operation.

31. The circuit of claim 30, further comprising:

wherein said first write buffer and said first write latch are coupled to store the address and data on a first write operation when the operation is a write operation;

a latch select circuit coupled to indicate whether a subsequent write operation is to said loaded first write address contained within said first write address latch when the operation is a write operation; wherein said first write latch data coupled to transfer said data to said second write latch and further coupled to transfer said first write address to said second write buffer when the operation is a write operation;

said second write latch data is coupled to transfer data to said main memory array when the operation is a write operation;

said first write latch and said first write address latch are coupled to receive the data and address of said subsequent write operation if said subsequent write operation is to a location not contained within said first write latch when the operation is a write operation; and said first write latch is coupled to store said subsequent write operation data if said subsequent write operation is to a location contained within said first write latch when the operation is a write operation.

32. The circuit of claim 30 wherein:

said second read buffer is coupled to store the address on a first read operation when the operation is a read operation;

said second read latch is coupled to receive data from said main memory array when the operation is a read operation; and said second read latch is coupled to provide data to said expansion bus after transfer from said main memory array when the operation is a read operation.

33. The circuit of claim 32, further comprising:

a latch select circuit coupled to indicate whether a subsequent read operation is from an address location having data contained in said second read latch when the operation is a read operation; and wherein said second read latch is coupled to provide said subsequent data to said expansion bus when the operation is a read operation;

said main memory array is coupled to provide data at the next sequential address when the operation is a read operation; and said first read latch coupled to store said next sequential data, and said first read address latch coupled to store said next sequential address if said subsequent read operation is to a location having data contained in said second read latch when the operation is a read operation.

34. The circuit of claim 33, further comprising:

a latch select circuit coupled to indicate whether a subsequent read operation is from an address location having data contained in said second read latch, after filling said first read latch and said first read address latch when the operation is a read operation; and wherein said second read latch coupled to provide data to said expansion bus from said second read latch if said subsequent read operation is to a location having data contained in said second read latch when the operation is a read operation.

35. The circuit of claim 33, further comprising:

a latch select circuit coupled to indicate whether a subsequent read operation is from an address location having data contained in said first read latch, after filling said first read latch and said first read address latch when the operation is a read operation; and wherein said first read latch is coupled to transfer data to said second read latch when the operation is a read operation;

said first read address latch is coupled to transfer the address value to said second read address latch when the operation is a read operation;

said second read latch coupled to provide said data to said expansion bus when the operation is a read operation; and said main memory array is coupled to provide data at the next sequential address and said first read address latch is coupled to store said next sequential address if said subsequent read operation is to a location having data contained in said first read latch when the operation is a read operation.

36. In a computer system having an expansion bus, a bus master connected to said expansion bus, a host bus having address, data and control signals, a CPU connected to said host bus, a main memory array, a memory controller coupled to said memory array, and a data transfer unit positioned between said expansion bus, said host bus and said main memory array, said data transfer unit having a plurality of latches connected between said main memory array and said expansion bus, a circuit comprising:

a first write latch coupled to receive data from said expansion bus when an operation is a write operation;

a second write latch coupled to receive data from said first write latch when the operation is a write operation, said second write latch coupled to provide data to said main memory array when the operation is a write operation; and a data transfer controller for controlling transfer of data from said expansion bus to said first write latch to said second write latch to said main memory array when the operation is a write operation;

a first read latch coupled to receive data from said main memory array when the operation is a read operation;

a second read latch coupled to receive data from said first read latch when the operation is a read operation, said second read latch coupled to provide data to said expansion bus when the operation is a read operation;

a data transfer controller for controlling transfer of data from said main memory array to said first read latch to said second read latch to said expansion bus when the operation is a read operation; and an input/output device coupled to said expansion bus to said CPU, for transferring instructions from a user.

37. The circuit of claim 36, further comprising:

a first write buffer coupled to store the address of data contained in the first write latch at a first write address latch when the operation is a write operation;

a second write buffer coupled to store the address of data contained in the second write latch at a second write address latch when the operation is a write operation;

a first read buffer coupled to store the address of data contained in the first read latch at a first read address latch when the operation is a read operation; and a second read buffer coupled to store the address of data contained in the second read latch at a second read address latch when the operation is a read operation.

38. The circuit of claim 37, further comprising:

a latch select circuit coupled to indicate whether a subsequent write operation is to said loaded first write address contained within said first write address latch when the operation is a write operation; and wherein said first write buffer and said first write latch are coupled to store the address and data on a first write operation when the operation is a write operation, said first write latch coupled to transfer said data to said second write latch and further coupled said first write address to said second write buffer when the operation is a write operation, said second write latch data is coupled to transfer data to said main memory array and said first write latch and said first write address latch are coupled to receive the data and address of said subsequent write operation if said subsequent write operation is to a location not contained within said first write latch when the operation is a write operation; and said first write latch is coupled to store said subsequent write operation data if said subsequent write operation is to a location contained within said first write latch when the operation is a write operation.

39. The circuit of claim 37, wherein:

said second read buffer is coupled to store the address on a first read operation when the operation is a read operation;

said second read latch is coupled to receive data from said main memory array when the operation is a read operation; and said second read latch is coupled to provide data to said expansion bus after transfer from said main memory array when the operation is a read operation.

40. The circuit of claim 39, further comprising:

a latch select circuit coupled to indicate whether a subsequent read operation is from an address location having data contained in said second read latch when the operation is a read operation; and wherein said second read latch is coupled to provide said subsequent data to said expansion bus when the operation is a read operation;

said main memory array is coupled to provide data at the next sequential address; and said first read latch coupled to store said next sequential data, and said first read address latch coupled to store said next sequential address if said subsequent read operation is to a location having data contained in said second read latch when the operation is a read operation.

41. The circuit of claim 40, further comprising:

a latch select circuit coupled to indicate whether a subsequent read operation is from an address location having data contained in said second read latch, after filling said first read latch and said first read address latch when the operation is a read operation; and wherein said second read latch coupled to provide data to said expansion bus from said second read latch if said subsequent read operation is to a location having data contained in said second read latch when the operation is a read operation.

42. The circuit of claim 40, further comprising:

a latch select circuit coupled to indicate whether a subsequent read operation is from an address location having data contained in said first read latch, after filling said first read latch and said first read address latch when the operation is a read operation; and wherein said first read latch is coupled to transfer data to said second read latch when the operation is a read operation, said first read address latch is coupled to transfer the address value to said second read address latch when the operation is a read operation, said second read latch coupled to provide said data to said expansion bus when the operation is a read operation, said main memory array is coupled to provide data at the next sequential address when the operation is a read operation; and said first read address latch is coupled to store said next sequential address if said subsequent read operation is to a location having data contained in said first read latch when the operation is a read operation.

* * * * *